(12) United States Patent
Adachi

(10) Patent No.: US 9,166,209 B2
(45) Date of Patent: Oct. 20, 2015

(54) BATTERY UNIT WITH SWELL LIMITER FOR CELL

(71) Applicant: DENSO CORPORATION, Kariya-city, Aichi-pref. (JP)

(72) Inventor: Yoshiki Adachi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 13/935,705

(22) Filed: Jul. 5, 2013

(65) Prior Publication Data

US 2014/0011056 A1 Jan. 9, 2014

(30) Foreign Application Priority Data

Jul. 5, 2012 (JP) .................. 2012-151373

(51) Int. Cl.
| | |
|---|---|
| *H01M 2/02* | (2006.01) |
| *H01M 10/42* | (2006.01) |
| *H01M 2/10* | (2006.01) |
| *B60L 3/00* | (2006.01) |
| *B60L 3/12* | (2006.01) |
| *B60L 11/18* | (2006.01) |

(52) U.S. Cl.
CPC ............. *H01M 2/024* (2013.01); *B60L 3/0046* (2013.01); *B60L 3/0069* (2013.01); *B60L 3/12* (2013.01); *B60L 11/1861* (2013.01); *B60L 11/1864* (2013.01); *B60L 11/1874* (2013.01); *B60L 11/1879* (2013.01); *H01M 2/1077* (2013.01); *H01M 2/1094* (2013.01); *H01M 10/425* (2013.01); *B60L 2240/545* (2013.01); *B60L 2240/662* (2013.01); *B60L 2270/145* (2013.01); *H01M 2220/20* (2013.01)

(58) Field of Classification Search
CPC .......... H01M 10/0525; H01M 10/052; H01M 10/0413; H01M 10/425; H01M 2/024; H01M 2/1077; H01M 2/1094; H01M 2220/20
USPC ............................................................. 429/7
See application file for complete search history.

(56) References Cited

U.S. PATENT DOCUMENTS

| | | | | | |
|---|---|---|---|---|---|
| 1,785,202 | A | * | 12/1930 | Lubeck ........................... | 429/66 |
| 4,729,933 | A | * | 3/1988 | Oswald ........................... | 429/59 |
| 6,117,583 | A | * | 9/2000 | Nilsson et al. .................. | 429/66 |
| 8,962,174 | B2 | * | 2/2015 | Adachi et al. .................. | 429/149 |
| 2011/0244283 | A1 | * | 10/2011 | Seto et al. ....................... | 429/91 |
| 2011/0250485 | A1 | * | 10/2011 | Tsukuda ........................ | 429/153 |
| 2014/0011058 | A1 | * | 1/2014 | Adachi et al. ................... | 429/61 |

FOREIGN PATENT DOCUMENTS

JP   A-2011-216401   10/2011

* cited by examiner

*Primary Examiner* — Stewart Fraser
(74) *Attorney, Agent, or Firm* — Oliff PLC

(57) ABSTRACT

A battery unit is provided which includes an assembled battery module equipped with a plurality of cells, a control board on which a charging/discharging controller is mounted, a storage case in which the assembled battery module, and the control board are disposed, and a swell limiter. The assembled battery module includes a battery body in which the cells are stacked over a bottom plate The swell limiter is located on the opposite side of the assembled battery module than the bottom plate is. The swell limiter is separate from the battery body when any of the cells is not swelling and works to make physical contact with the battery body when any of the cells has swollen to suppress swelling of the cell.

8 Claims, 21 Drawing Sheets

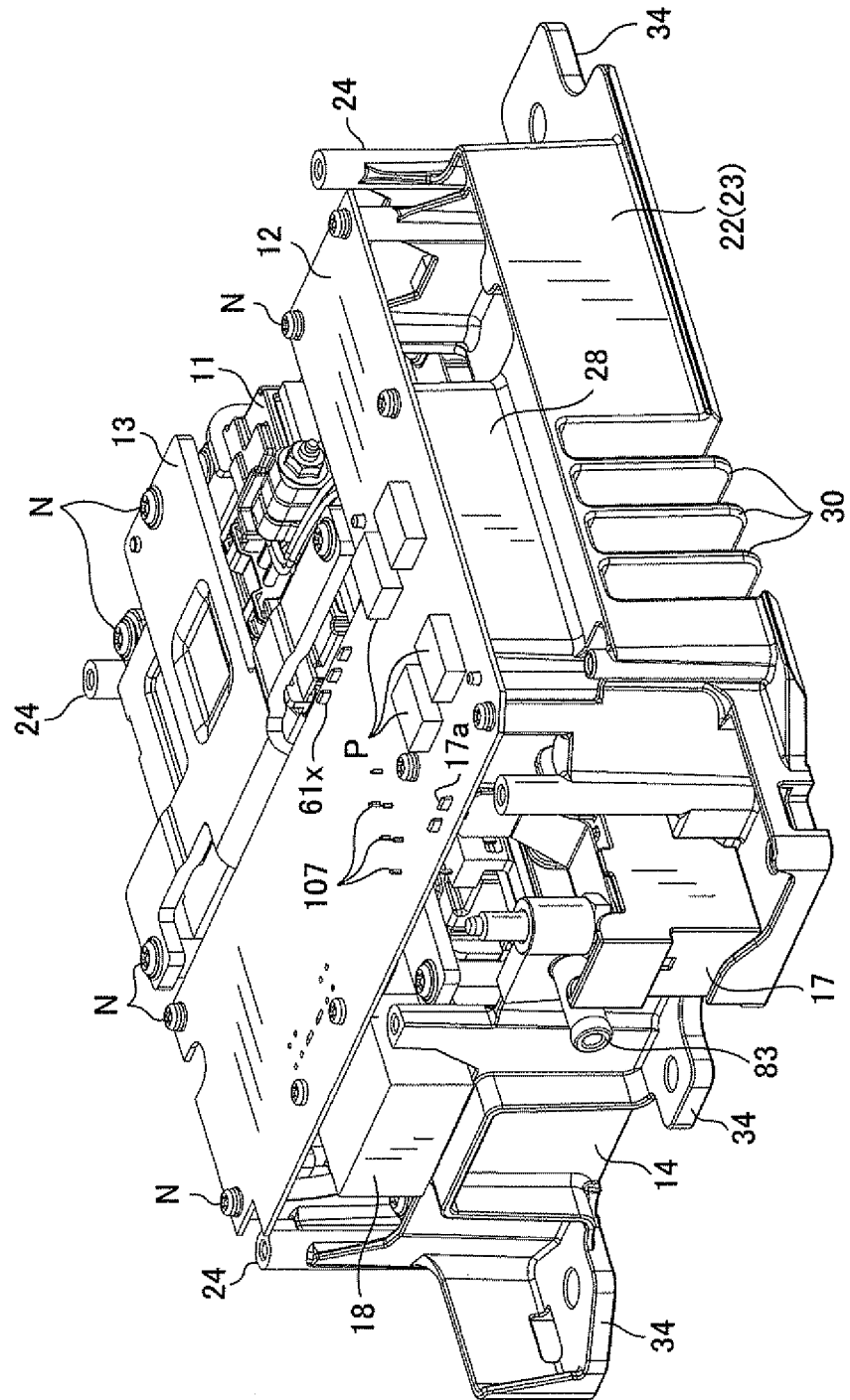

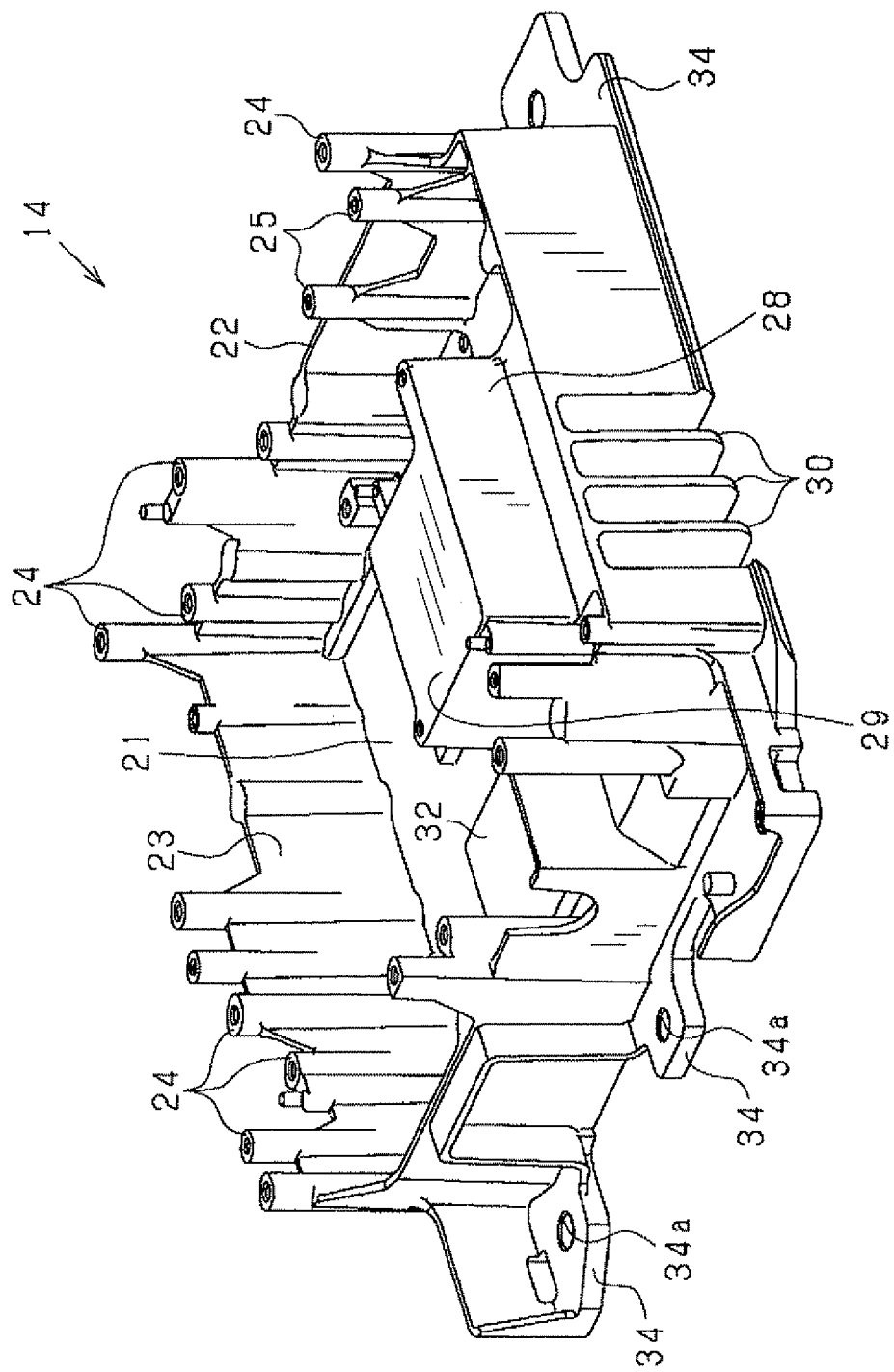

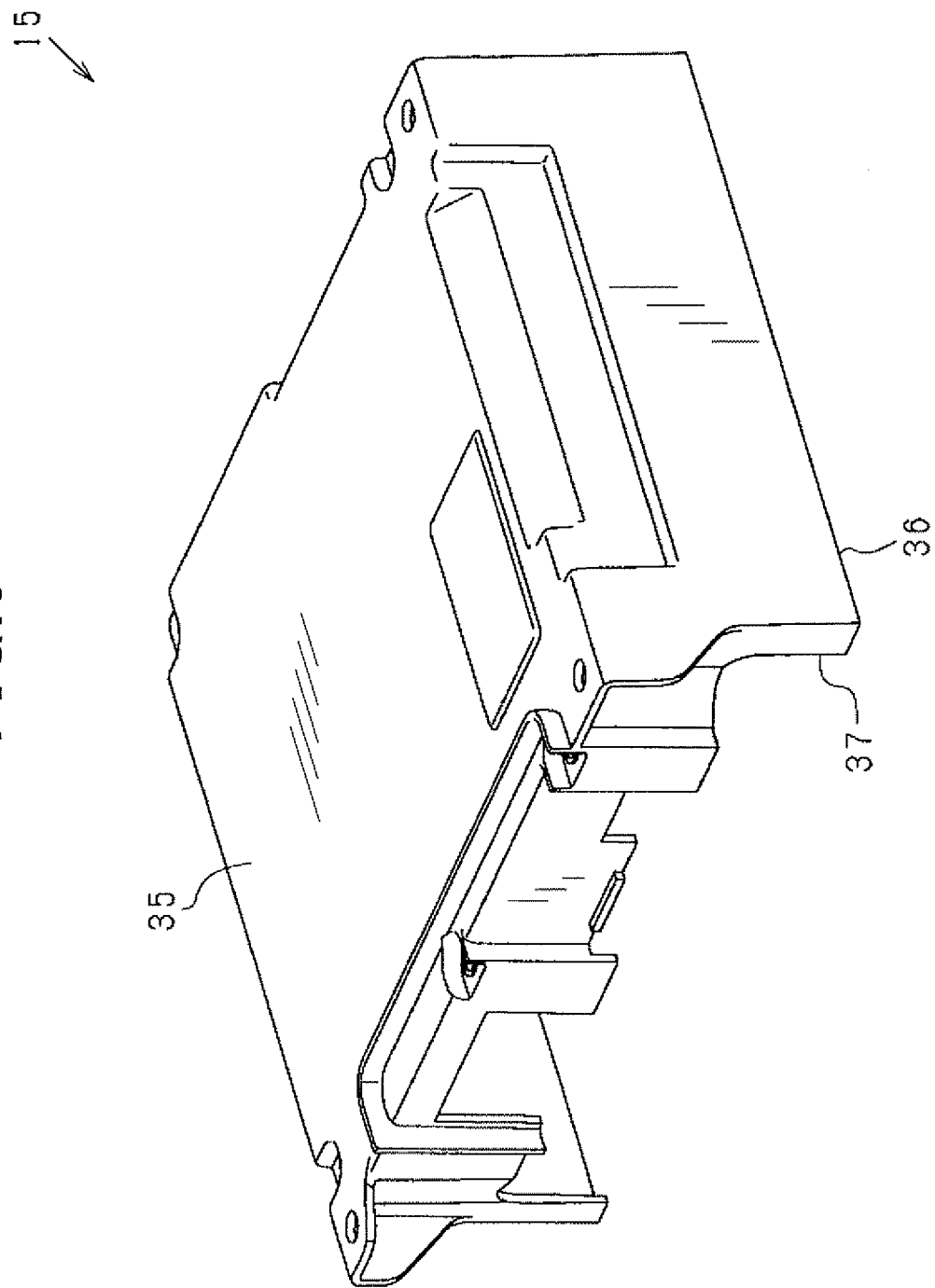

BATTERY UNIT WITH SWELL LIMITER FOR CELL

CROSS REFERENCE TO RELATED DOCUMENT

The present application claims the benefit of priority of Japanese Patent Application No. 2012-151373 filed on Jul. 5, 2012, the disclosure of which is incorporated herein by reference.

BACKGROUND OF THE INVENTION

1. Technical Field of the Invention

The present invention relates generally to a battery unit which includes an assembled battery module and is installed in vehicles such as automobiles, and more particularly to such a battery unit equipped with a swell limiter working to suppress swelling of cells.

2. Background Art

Japanese Patent First Publication No. 2011-216401 teaches how to pack an assembled battery module made up of a plurality of electric cells along with a control board to make a battery unit. This type of battery unit may experience swelling of each of the cells with use. Several techniques, thus, have been studied to suppress such swelling of the cells. For instance, a battery casing in which the cells are disposed has been proposed to have rigidity great enough to withstand the swelling of the cells.

Specifically, the battery casing is designed to be placed in direct contact with outer surfaces of the respective cells to suppress the swelling of the cells. Therefore, when they do not yet swell or have only swelled slightly, the cells will be subjected to mechanical pressure externally and adversely affected by heat or vibration.

For example, when the battery unit is mounted in a vehicle such as an automobile, mechanical vibration usually continues to be exerted on the battery unit during running of the vehicle. There is still room for improvement on the ease with which the cells are impacted by the heat or vibration.

SUMMARY OF THE INVENTION

It is therefore an object of this disclosure to provide a battery unit which is designed to minimize undesirable swelling or deformation of an assembled battery module and be insusceptible to external physical factors such as heat or vibration.

According to one aspect of the embodiment, there is provided a battery unit which may be employed with automatic vehicles. The battery unit comprises: (a) an assembled battery module equipped with a plurality of cells; (b) a control board on which a controller is mounted to control a charging/discharging operation of the cells; and (c) a storage case in which the assembled battery module and the control board are disposed. The storage case includes a bottom plate over which the assembled battery module is mounted. The assembled battery module includes a battery body in which the cells are stacked over the bottom plate The battery unit also includes a swell limiter located on the opposite side of the assembled battery module than the bottom plate is. The swell limiter is separate from the battery body when none of the cells are swollen and makes physical contact with the battery body when any of the cells has swollen to suppress swelling of the cell.

The battery body of the assembled battery module is interposed between the bottom plate of the storage case and the swell limiter. The swell limiter is located at a given interval away from the battery body before the cells swell with time, for example, and works to make physical contact with the battery body when any of the cells has swollen, thereby rigidly withstanding expansion of the battery body arising from the swelling of the cell. Therefore, before the cells swell, the swell limiter does not exert an undesirable mechanical load on the cells to keep the cells free from adverse effects of, for example, heat or vibration. When any of the cells has swollen, so that the surface of the battery body touches the swell limiter, the swell limiter works to limit the swelling of the cell. In this manner, the swell limiter suppresses the undesirable deformation of the cells without increasing the adverse effects on the cells.

In the preferred mode of the embodiment, the swell limiter is made of a press plate which has a degree of rigidity high enough to withstand elastic deformation thereof when subjected to pressure arising from swelling of the cells. The press plate is fixed on an upright member extending from the bottom plate of the base using a screw. This facilitates the stability of the press plate in rigidly suppressing the swelling of the cell.

The battery body may be designed to have a first surface and a second surface opposed to the first surface. The battery body is placed with the second surface facing the bottom plate of the storage case. The press plate has a surface which faces the first surface of the battery body at a given interval away therefrom when none of the cells are swollen. The press plate is so shaped as to have a first distance and a second distance different from the first distance between the surface of the press plate and the first surface of the battery body. The first distance is a minimum interval between the surface of the press plate and an area of the first surface of the battery body which covers a portion of the cells expected to expand most greatly. The second distance is a minimum interval between the surface of the press plate and another area of the first surface of the battery body. The first distance is set smaller than the second distance. Therefore, when any of the cells has swollen, the press plate will first touch the area of the first surface of the battery body which covers the portion of the cells expected to expand most greatly, thereby limiting the swelling of the cell.

At least one of the battery body and the press plate has a protrusion which bulges toward the other of the battery body and the press plate. The protrusion has a surface which makes physical contact with the other of the battery body and the press plate when any of the cells has swollen. The protrusion is located in alignment with the portion of the cells expected to expand most greatly in a direction in which the cells swell. The protrusion makes the first distance smaller than the second distance. Therefore, when any of the cells has swollen, the protrusion will first touch the area of the first surface of the battery body which covers the portion of the cells expected to expand most greatly, thereby rigidly limiting the swelling of the cell.

Each of the cells is cuboid and has a first and a second maximum surface opposed to each other. The first and second maximum surfaces are major surfaces that are the greatest in area of the whole of an outer surface of the cell. The cells are arranged with the first maximum surface being oriented to face the bottom plate of the base and the second maximum surface being located farther away from the bottom plate. The protrusion is provided on a portion of at least one of the battery body and the press plate which faces a central portion of the second maximum surface of one of the cells. Usually, the central portion of each of the cells will expand or swell most greatly. The protrusion will thus first make the physical contact with the central portion of the cells to suppress the swelling of the cells.

The bottom plate may have a bottom protrusion which bulges toward the battery body. The bottom protrusion has a surface which makes physical contact with a portion of the battery body which is aligned with the portion of the cells expected to expand most greatly in the direction in which the cells swell.

The battery unit also includes a battery case equipped with partition plates to define within the battery case cell chambers which are laid to overlap each other and in which the cells are disposed, respectively, in a stacked form. The partition plates work to limit swelling of the cells.

Each of the cells is disposed in one of the cell chambers at a given interval away from at least one of the partition plates. Therefore, before the cells swell, the partition plates do not exert an undesirable mechanical load on the cells to keep the cells free from adverse effects of, for example, heat or vibration. When any of the cells has swollen, so that the surface of the battery body touches the partition plate(s), the partition plate(s) work to limit the swelling of the cell.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 6 is a perspective view which illustrates a control board disposed on the assembly of the assembled battery module and the press plate, as shown in FIG. 5;

FIG. 7 is a perspective view which illustrates a structure of a base of the battery unit of FIG. 1;

FIG. 9 is a perspective view which illustrates a cover of the battery unit of FIG. 1;

DESCRIPTION OF THE PREFERRED EMBODIMENTS

Figure 1:
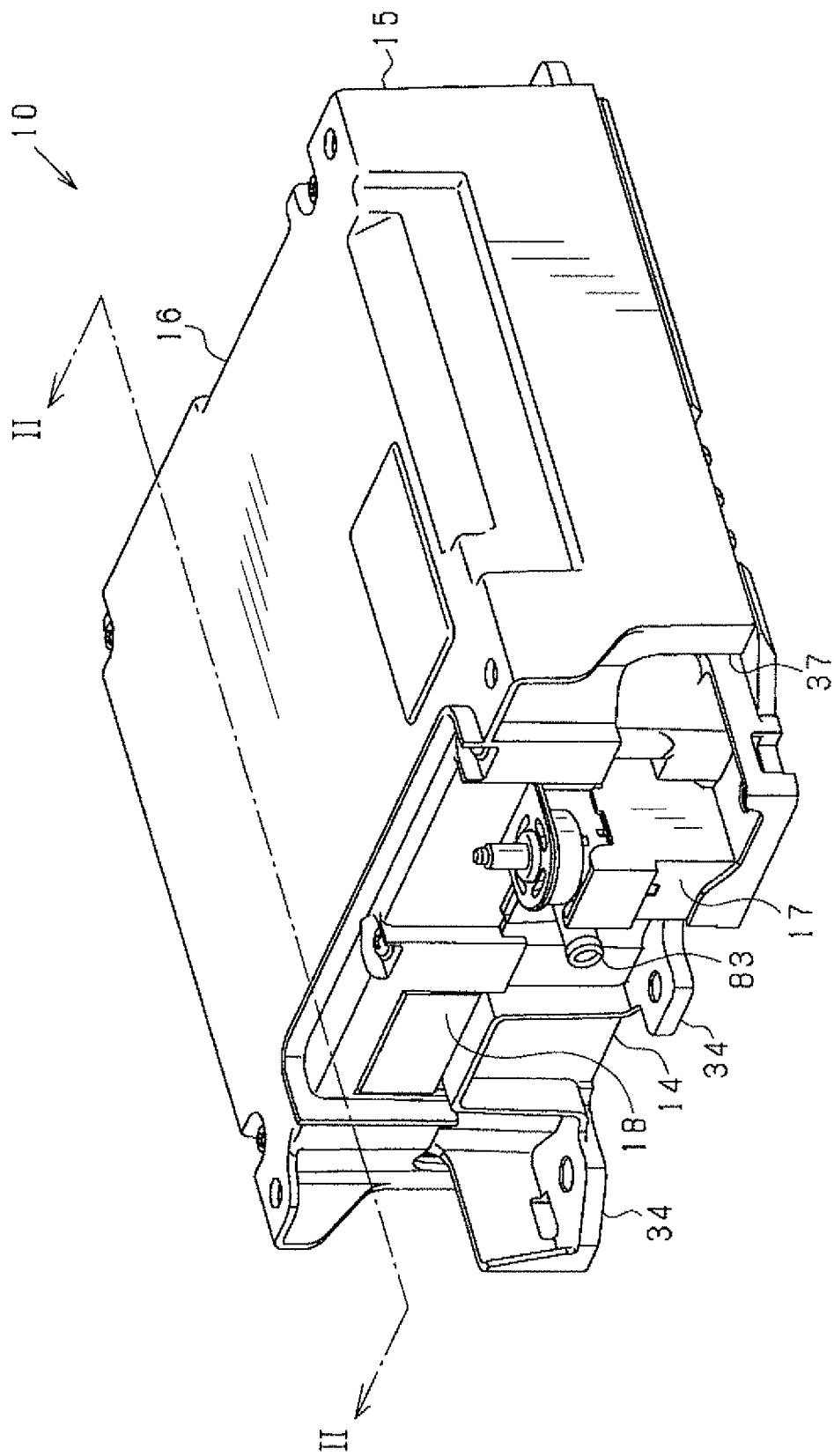
FIG. 1 is a perspective view which shows a battery unit according to an embodiment.

Referring to the drawings, wherein like reference numbers refer to like parts in several views, particularly to FIGS. 1 to 6, there is shown a battery unit 10 which is used, as an example, with a power supply system installed in an automotive vehicle equipped with an internal combustion engine, an electronic control unit (ECU) working to control operations of the engine or other electric devices, an electric generator (also called an alternator) which is driven by the engine to generate electricity, and an electric storage device which is charged by electric power produced by the generator. The electric storage device includes a lead acid battery and lithium-ion battery. The battery unit 10, as will be described below, is designed as the lithium-ion battery.

The overall structure of the battery unit 10 will be described below with reference to FIGS. 1 to 6. A vertical direction of the battery unit 10, as referred to in the following discussion, is based on orientation of the battery unit 10 placed, as illustrated in FIG. 1, on a horizontal plane for the sake of convenience.

Figure 5:
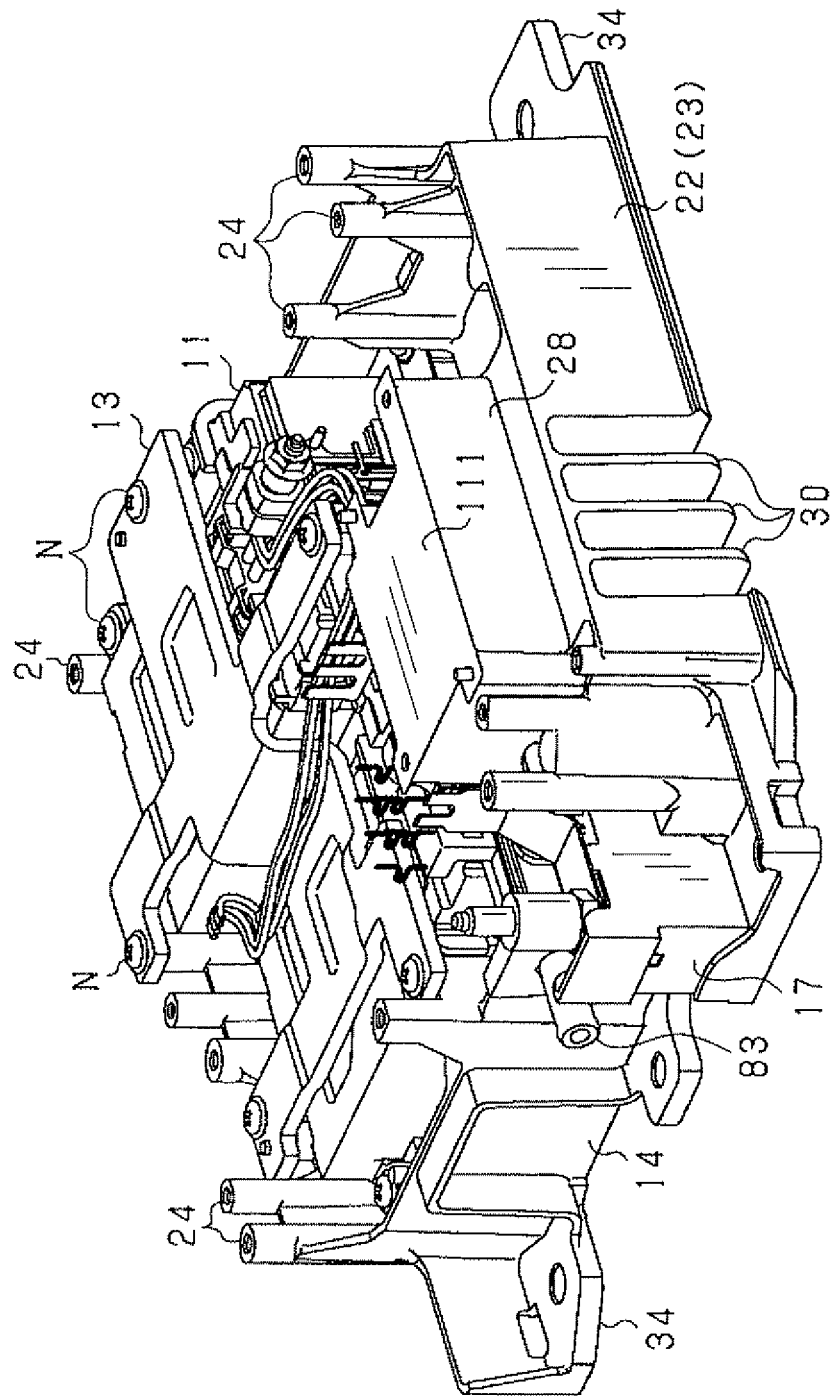
FIG. 5 is a perspective view which illustrates a base on which an assembled battery module and a press plate are mounted.

The battery unit 10 consists essentially of an assembled battery module 11, a control board 12, a press plate 13, and a storage case 16. The assembled module 11 is made up of a plurality of electric cells. The control board 12 works as a controller to control charging or discharging of the assembled battery module 11. The press plate 13 exerts pressure on the assembled battery module 11 from above. The storage case 16 is made up of a base 14 and a cover 15. The assembled battery module 11 and the control board 12 are laid to overlap each other vertically. Specifically, the control board 12 is disposed above the assembled battery module 11. The assembled battery module 11 and the control board 12 are fixed on the base 14. FIG. 5 illustrates the base 14 on which the assembled battery module 11 and the press plate 13 are mounted. FIG. 6 illustrates the control board 12 disposed on the assembly of the assembled battery module 11 and the press plate 13, as shown in FIG. 5. The cover 15 is put on the assembly of the control board 12, the assembled battery module 11, and the press plate 13, as shown in FIG. 6, to make the battery unit 10 of FIG. 1. The assembled battery module 11 and the control board 12 are disposed within the case 16.

The battery unit 10 is equipped with a terminal block 17 for electric connection with an external lead-acid battery or an electric generator and an electric connector 18 for electric connection with the ECU mounted in the vehicle. The terminal block 17 and the connector 18 are, as can be seen in FIG. 1, partially exposed outside the battery unit 10.

The structure of the battery unit 10 will be described below in detail.

Storage Case 16

Figure 8A:
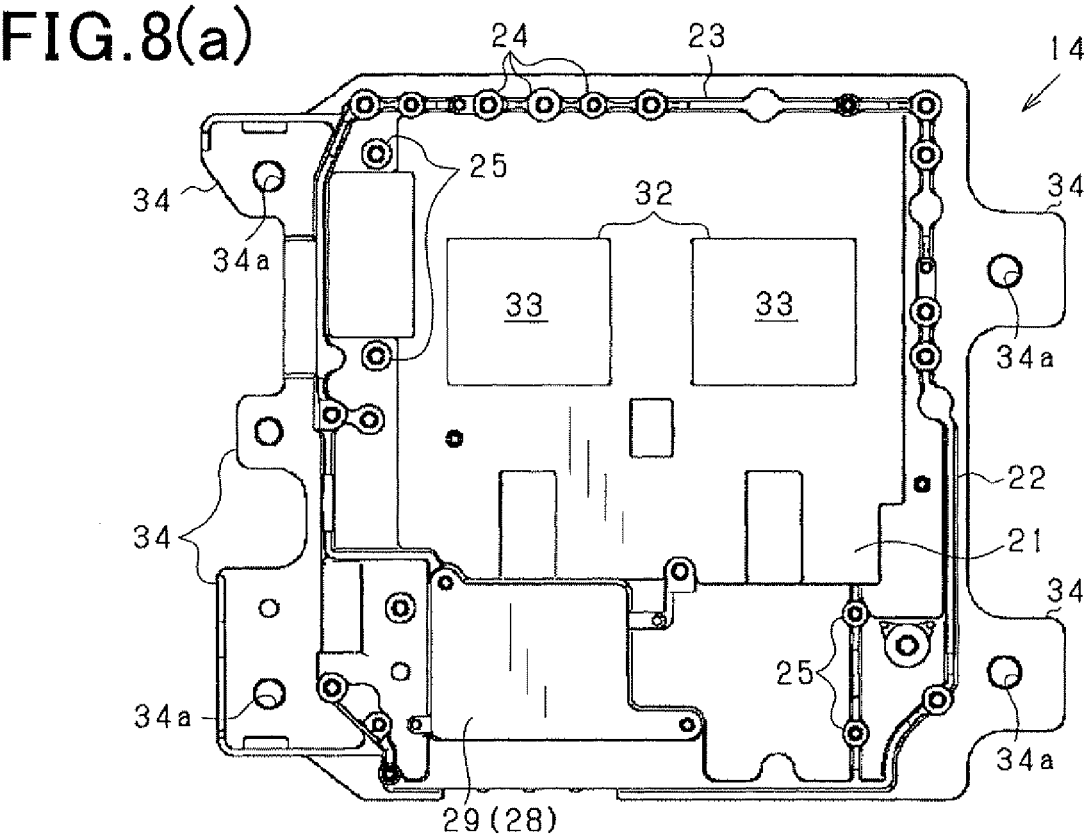
FIG. 8(a) is a top view of the base, as shown in FIG. 7.
Figure 8B:
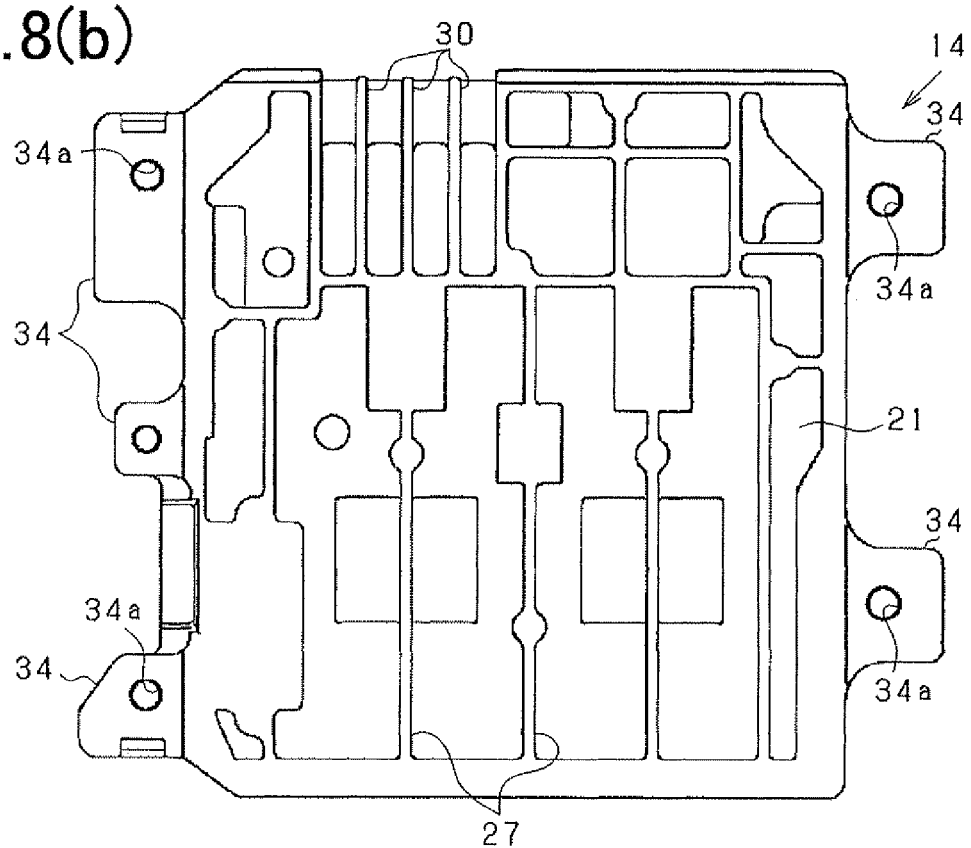
FIG. 8(b) is a bottom view of the base, as shown in FIG. 7.

The base 14 of the battery unit 10 will be explained. FIG. 7 is a perspective view of the base 14. FIGS. 8(a) and 8(b) are a top view and a bottom view of the base 14, respectively.

The base 14 is made from a metallic material such as aluminum and includes a bottom plate 21 and an upright wall 22 extending vertically from the bottom plate 21. The bottom plate 21 is substantially square in shape and has a circumferential edge from which the upright wall 22 extends. In other words, the upright wall 22 surrounds the circumference edge of the bottom plate 21. The bottom plate 21 serves as a module mount on which the assembled battery module 11 is retained. The upright wall 22 is so shaped as to completely encompass the assembled battery module 11 mounted on the bottom plate 21.

The upright wall 22 includes a fence plate 23 and a plurality of cylindrical supports (i.e., support pillars) 24 extending vertically from the fence plate 23. The fence plate 23 substantially defines a height of the upright wall 22, in other words, has an upper end as an upper end of the upright wall 22. When the base 13 is placed with the bottom plate 21 lying horizontally, the upper end of the fence plate 23 defines an upper limit at which the upright wall 22 prevents the entrance of water into the base 14.

Each of the cylindrical supports 23 extend away from the bottom plate 21 above the upper end of the fence plate 23. The cylindrical supports 23 have upper ends on which the assembled battery module 11 the control board 12, and the press plate 13 are fixed. Specifically, each of the cylindrical supports 23 has an internal thread formed in the upper end thereof. The installation of the assembled battery module 11 the control board 12, and the press plate 13 on the base 14 is achieved by fastening screws N into the threads of the cylindrical supports 23. The base 14 also includes cylindrical mounts 25 which retain the assembled battery module 11 and the control board 12. The cylindrical mounts 25 are separate from the upright wall 22 and extend from the bottom plate 21 vertically.

The base 14 is equipped with a heat dissipater which serves to release heat, as generated by the assembled battery module 11 and the control board 12, to the environment. Specifically, the base 14 has, as illustrated in FIG. 8(b), ribs 27 formed as the heat dissipater on a lower surface of the base plate 21. The heat, as produced by the assembled battery module 11 and the control board 12, is transmitted to the bottom plate 21 through the upright wall 22 and then released from the ribs 27 on the bottom plate 21 outside the battery unit 10.

Figure 3:
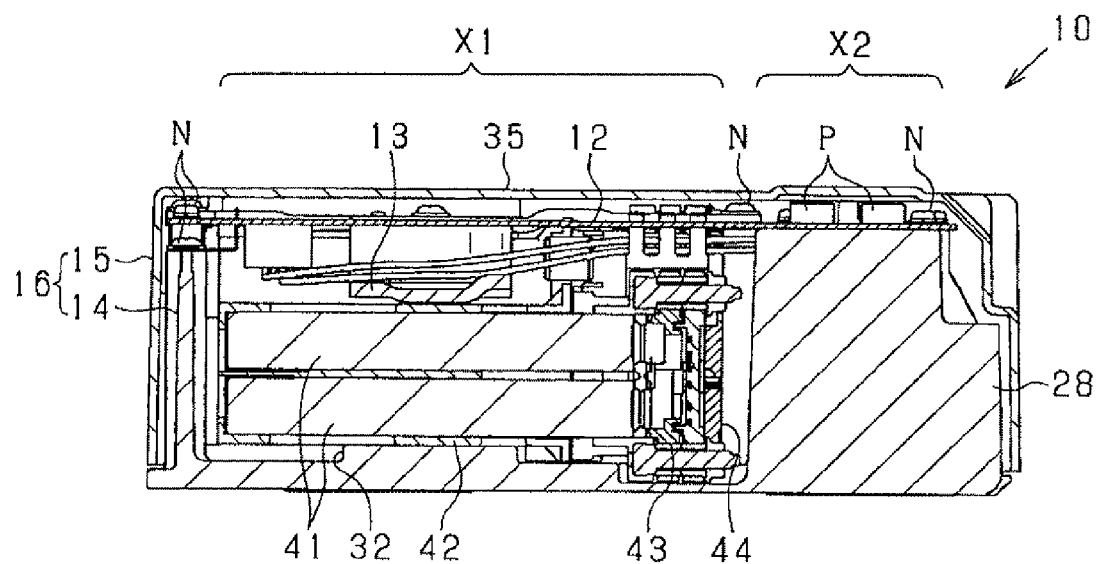
FIG. 3 is a sectional view, as taken along the line III-III in FIG. 2.

The bottom plate 12 has a heat radiator 28 disposed on an upper surface thereof. The heat radiator 28 faces the back surface of the control board 12 to release heat generated by power devices fabricated on the control board 28. The heat radiator 28 will also be referred to as a power device heat dissipater below. The power device heat dissipater 28 has an upper surface as a board-facing plate 29 which faces the control board 12. The board-facing plate 29 has formed on an lower surface thereof a plurality of fins 30 serving as a heat radiator or heat sink. The power device heat dissipater 28 is, as illustrated in FIG. 3, so oriented as to face areas on the control board 12 where the power devices P are mounted. The heat, as generated by the power devices P, is transmitted to the board-facing plate 29 and then released from the fins 30 outside the battery unit 10.

The power devices P are implemented by power semiconductor devices. Specifically, power transistors such as power MOSFETs or IGBTs are mounted as the power devices P on a power path leading to the assembled battery module 11 in the battery unit 10. The power devices P are turned on or off to control input or output of electric power into or from the assembled battery module 11. The battery unit 11 is, as described above, connected to the lead-acid battery and the electric generator. The power path leading to the assembled battery module 11 is, thus, connected to the lead-acid battery and the electric generator.

The bottom plate 21 has, as illustrated in FIGS. 7 and 8(a), two protrusions 32 formed on the upper surface thereof. The protrusions 32 bulge upwardly and have flat upper surfaces which serve as stopper surfaces 33 with which the assembled battery module 11 (i.e., a bulging portion of the assembled battery module 11) contacts when the cells 41 have swollen, that is, an amount of expansion of the assembled battery module 11 due to the swelling of at least one of the cells 41 has exceeded a given threshold value. The stopper surfaces 33 of the protrusions 32 are smaller than lower surface of the cells 41 of the assembled battery module 11, as will be described later in detail, and are, as illustrated in FIG. 2, placed in non-contact with a portion of a lower surface of the battery case 42 when the cells 41 are not swelling.

The bottom plate 21 also has flanges 34 extending outwardly from the upright wall 22. Each of the flanges 34 has a hole 34a through which a bolt passes for installation of the battery unit 10.

The cover 15 has a structure, as illustrated in FIG. 9. Specifically, the cover 15 is, like the base 14, made from a metallic material such as aluminum or from synthetic resin. The cover 15 includes a top plate 35 covering the top of the control board 12 and a side wall 36 extending from the top plate 35 downwardly. The top plate 35 is substantially square in shape. The side wall 36 extends from or near a circumferential edge of the top plate 35. The side wall 36 has three side surfaces extending from three of four edges of the top plate 35 and one open side surface 37 having an opening to expose the terminal block 17 and the connector 18 outside the cover 15.

Figure 2:
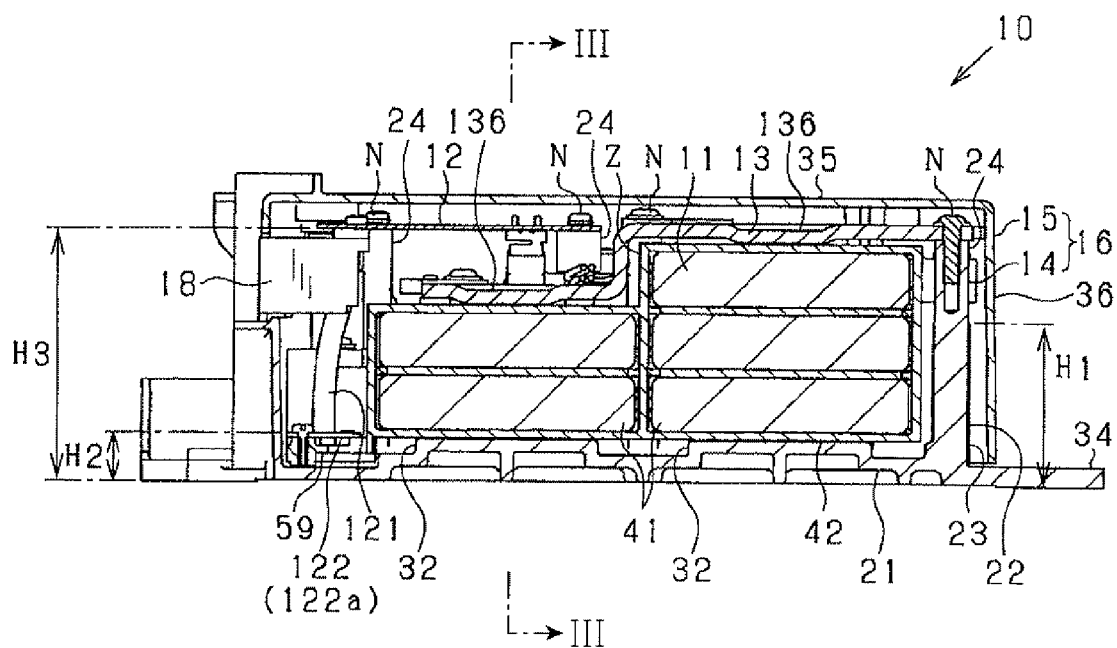
FIG. 2 is a transverse sectional view, as taken long the line II-II in FIG. 1.

The base 14 and the cover 15 are, as can be seen in FIGS. 2 and 3, assembled with the upright wall 22 of the base 14 lying inside the side wall 36 of the cover 15. The lower surface (i.e., the inner surface) of the top plate 35 of the cover 15 is placed partially in contact with the top ends of some of the cylindrical supports 24 of the upright wall 22 of the base 14. The side wall 36 of the cover 15 is, as described above, laid to overlap with the fence plate 23 of the upright wall 22 of the base 14 in a lateral direction of the battery unit 10 except the open side surface 37. If the battery unit 10 is fully submerged in water, the water will flow upward in a gap between the upright wall 22 and the side wall 36 and then enter inside the battery unit 10, thereby preventing the water from flooding from outside to inside the battery unit 10. Alternatively, if the battery unit 10 is splashed with water or partially put in water, the water will not enter the case 16 unless the level of water exceeds the fence plate 23 of the upright wall 22 of the base 14 which is located inside the side wall 36 of the cover 15.

Assembled Battery Module 11

Figure 10:
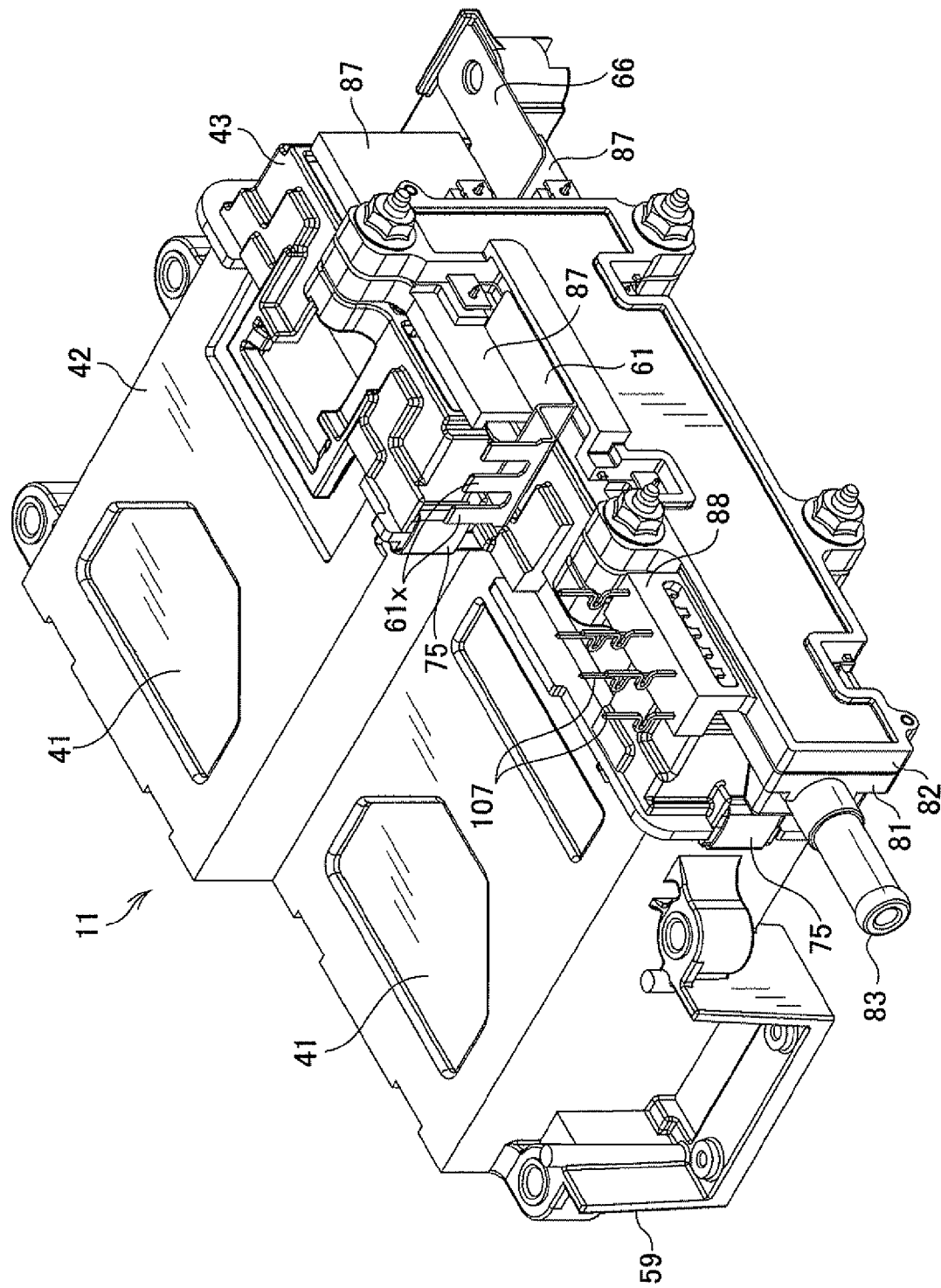
FIG. 10 is a perspective view which illustrates an assembled battery module installed in the battery unit of FIG. 1.
Figure 11:
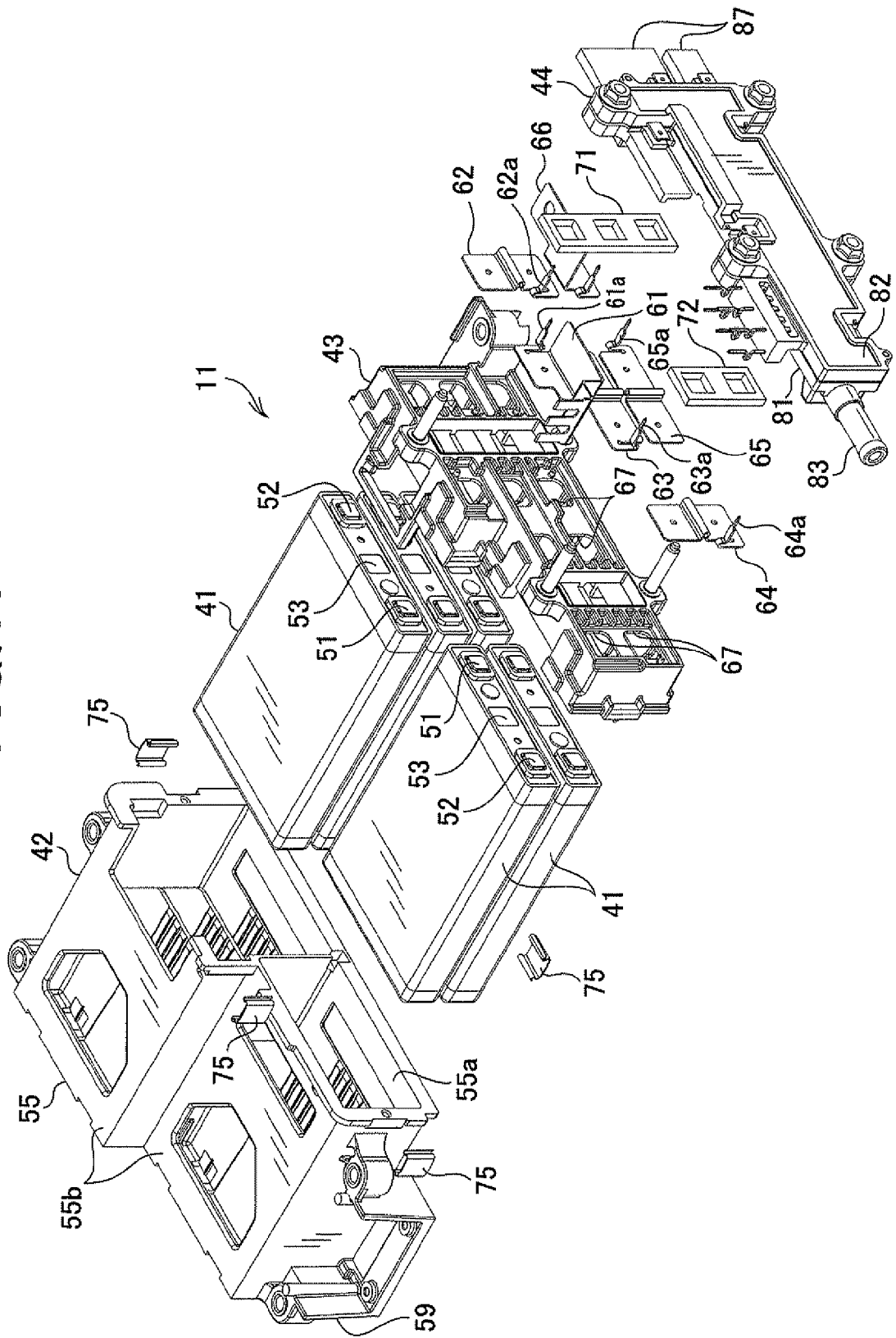
FIG. 11 is an exploded perspective view of the assembled battery module of FIG. 10.
Figure 12:
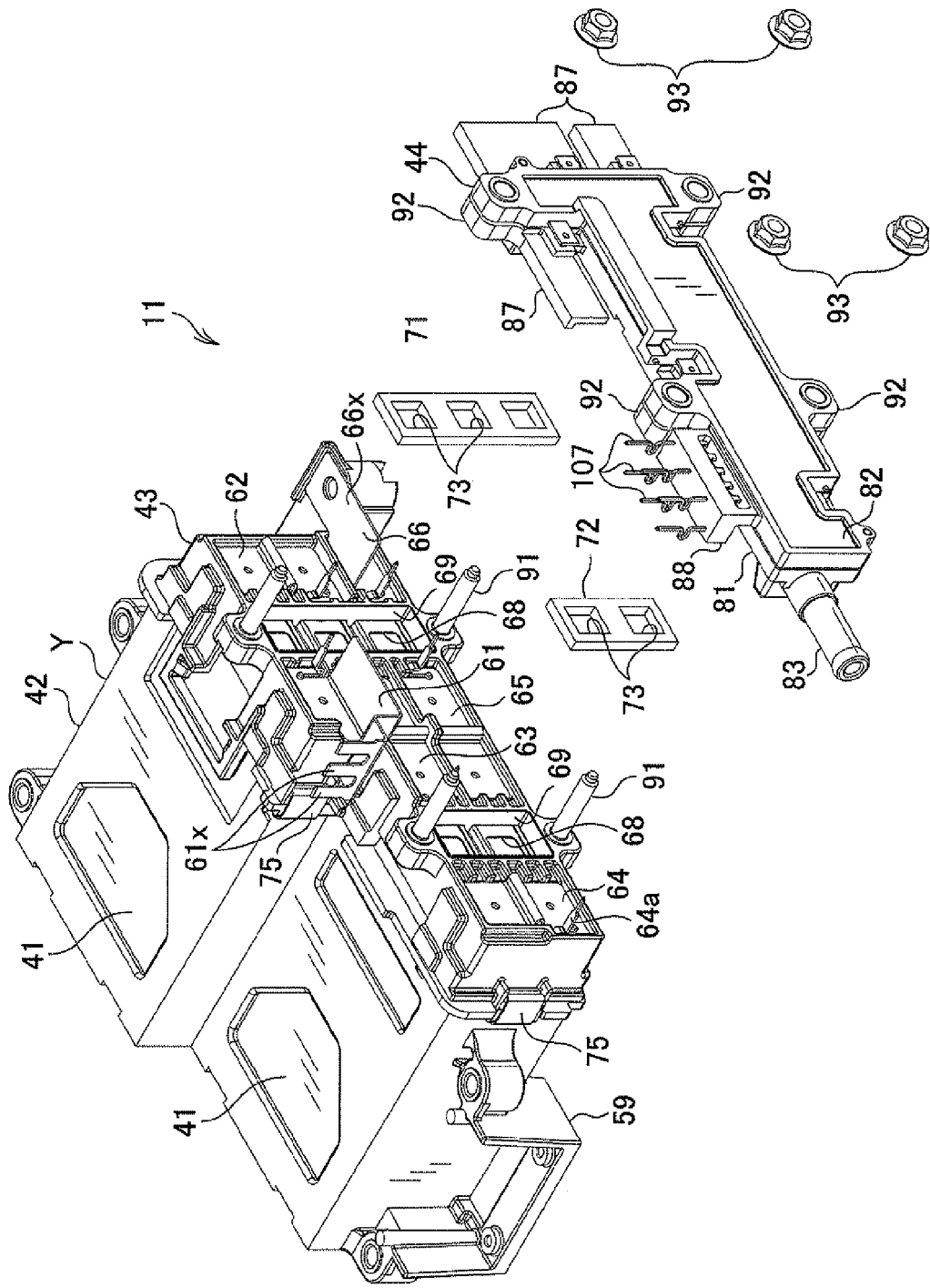
FIG. 12 is an exploded perspective view of the assembled battery module of FIG. 10.
Figure 13:
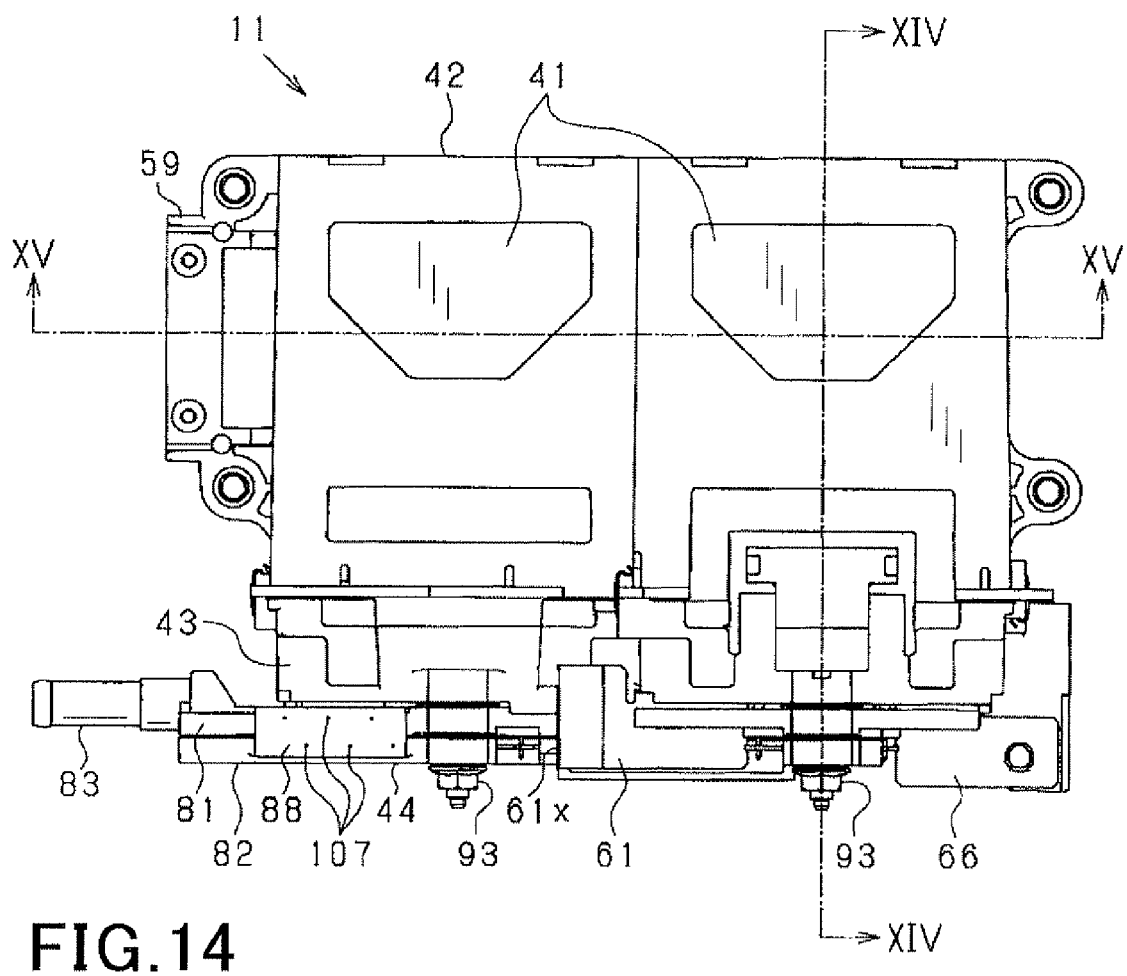
FIG. 13 is a plane view which illustrates the assembled battery module of FIG. 10.
Figure 14:
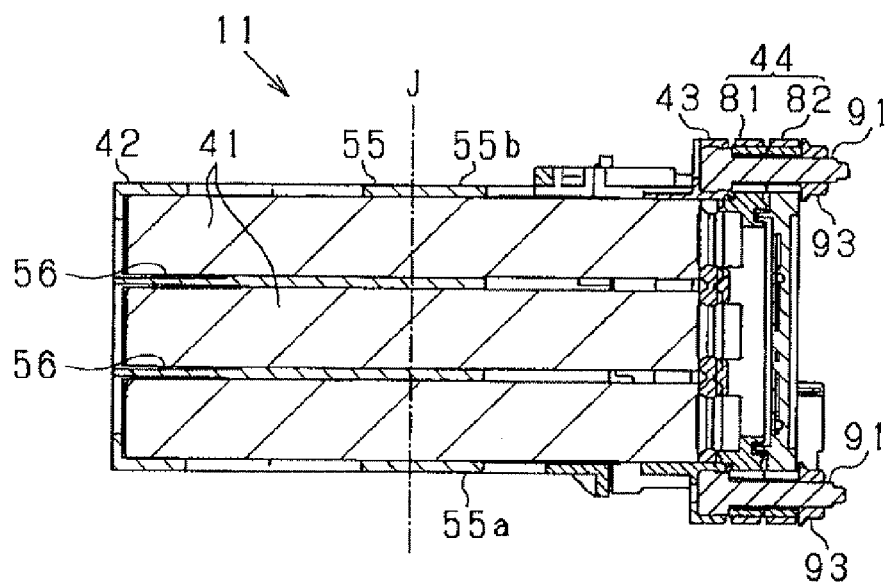
FIG. 14 is a sectional view, as taken long the line XIV-XIV in FIG. 13.
Figure 15:
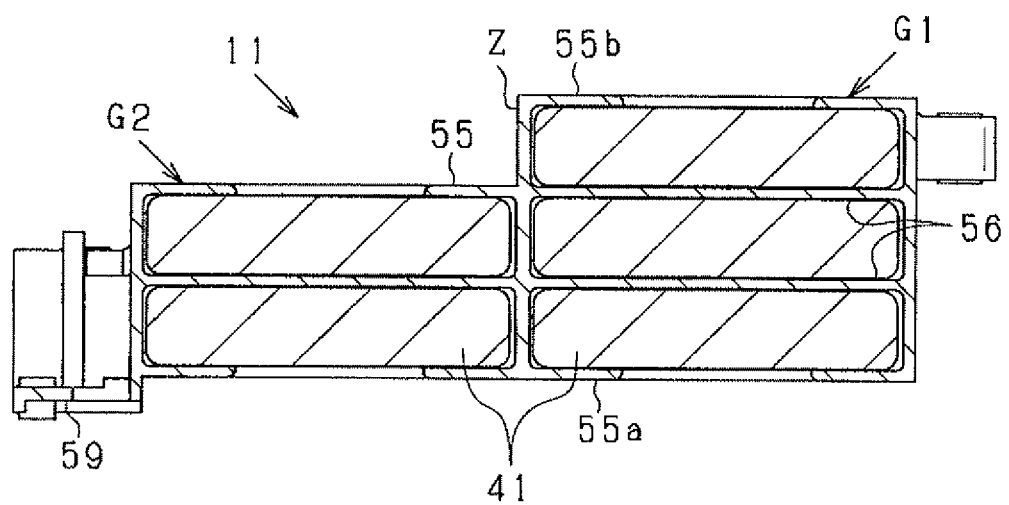
FIG. 15 is a sectional view, as taken long the line XV-XV in FIG. 13.

The structure of the assembled battery module 11 will be described below. FIG. 10 is a perspective view which illustrates the overall structure of the assembled battery module 11. FIGS. 11 and 12 are exploded perspective views of the assembled battery module 11. FIG. 13 is a plane view of the assembled battery module 11. FIG. 14 is a sectional view, as taken along the line XIV-XIV in FIG. 13. FIG. 15 is a sectional view, as taken along the line XV-XV in FIG. 13.

The assembled battery module 11 consists essentially of a plurality of (five in this embodiment) cells 41, the battery case 42, an insulating cover 43 installed on the battery case 42, and exhaust air ducts 44. The exhaust air ducts 44 are secured to one of opposed surfaces of the insulating cover 43 which is farther away from the cells 41. The cells 41, the battery case 42 in which the cells 41 are stacked, and the insulating cover 43 constitute a battery body Y, as illustrated in FIG. 12.

Cell 41

Each of the cells 41 is implemented by a thin cuboid lithium-ion storage cell. Each of the cells 41, as illustrated in FIG. 11, has a positive terminal 51 and a negative terminal 52 on one of ends thereof. The positive and negative terminals 51 and 52 are electrode terminals which slightly protrude from the end surface of each of the cells 41. Each of the cells 41 also has a gas release valve 53 between the positive and negative terminals 51 and 52. The gas release valve 53 works as a safety valve which is broken when the pressure in the cell 41 exceeds an upper limit to release the air in the cell 41. For instance, the gas release valve 53 is made of a hole formed in an end surface of an outer shell of the cell 41 and a thin metallic film closing the hole. When the pressure in the cell 41 exceeds the upper limit, the metallic film is broken, so that gas is discharged outside the cell 41, thereby avoiding the breakage of the cell 41 itself.

Battery Case 42

The battery case 42 is a container in which the five cells 41 are stacked at a given orientation. For example, the battery case 42 is made of insulating synthetic resin. The battery case 42 is retained at side walls thereof by the base 14. The battery case 42, as illustrated in FIGS. 11, 14, and 15, includes an outer shell 55 and partition plates 56 which define chambers which are laid to overlap each other vertically and within which the cells 41 are disposed, respectively. The outer shell 55 includes a lower plate 55a which defines a bottom surface of the assembled battery module 11 and faces the bottom plate 21 of the base 14 and an upper plate 55b which defines a top surface of the assembled battery module 11. The five cells 41 are broken down into two groups: a triple stacked cell group G1 made up of a stack of three of the cells 41 and a double stacked cell group G2 made up of a stack of the remaining two cells 41. The upper plate 55b (i.e., the top) of the outer shell 55 has two steps whose level difference is equivalent to the thickness of one of the cells 41. In other words, the assembled battery module 11 has a shoulder Z formed on the upper surface thereof. The control board 12 is, as illustrated in FIG. 2, positioned to the location of the shoulder Z. In other words, the control board 12 is laid over the shoulder Z (i.e., the double stacked cell group G2) to minimize an overall thickness of the battery pack 10. The space created above the shoulder Z is used to lay out, as will be described later in detail, connecting conductors under the control board 12 or install electric devices such as a thermistor, etc.

Each of the cells 41 is, as described above, cuboid and has two major surfaces opposed to each other through the thickness thereof. The major surfaces are the greatest in area of the whole of an outer surface of the cell 41. Within the battery case 42, the cells 41 are vertically laid to overlap each other with a lower one of the major surfaces of each of the cells 41 being oriented to face the bottom plate 21 and an upper one of the major surfaces being located farther away from the bottom plate 21. In other words, the cells 41 of each of the cell groups G1 and G2 are stacked in a thickness-wise direction thereof.

When the cells 41 are mounted in the battery case 42 in place, they partially protrude from the battery case 42. Specifically, the end of each of the cells 41 in which the positive and negative terminals 51 and 52 are disposed is located outside the battery case 42. The insulating cover 43 encloses those ends of the cells 41.

The lower plate 55a and the upper plate 55b of the battery case 42 have openings or windows in alignment with each other vertically. The windows are so formed in the lower plate 55a and the upper plate 55b that the lower plate 55a and the upper plate 55b are partially opposed to each other vertically through at least portions of the cells 41 around the center J thereof, as illustrated in FIG. 14.

The battery case 42 has formed integrally on the side wall thereof a sensor mount 59 on which a water damage sensor 122 is mounted at a given level from the upper surface of the bottom plate 21 of the base 14. The sensor mount 59 extends laterally from the outer shell 55 of the battery case 42 and retains the water damage sensor 122 on the same level as the lower plate 55a of the battery case 42. The water damage sensor 122 works as a submergence detection sensor to detect whether the battery unit 10 has been submerged in water or not.

Insulating Cover 43

The insulating cover 43, as illustrated in FIG. 11, has a plurality of (ten in this embodiment) openings 67 formed therein in alignment with the positive terminals 51 and the negative terminals 52 of the cells 41. When the insulating cover 43 is attached to the battery case 42, each of the positive and negative terminals 51 and 52 of the cells 41 is put in one of the openings 67. Bus bars 61 to 66, as illustrated in FIG. 12, are fit in the insulating cover 43 to close the openings 67. The bus bars 61 to 66 are used as electrode connectors which couple the positive terminals 51 and the negative terminals 52 of the cells 41 in series, respectively. FIG. 12 shows the bus bars 61 to 66 fit in the insulating cover 43.

Four of the six bus bars 61 to 66, that is, the bus bars 62 to 65 couple the positive terminal 51 of one of each adjacent two of the cells 41 arranged vertically or horizontally with the negative terminal 52 of the other cell 41. Specifically, each of the bus bars 62 and 64 couples the positive terminal 51 of one of vertically arranged two of the cells 41 with the negative terminals 52 of the other cell 41. Each of the 63 and 65 couples the positive terminal 51 of one of laterally arranged two of the cells 41 with the negative terminals 52 of the other cell 41.

The bus bar 61 is used as a connector to establish an electric connection of a positive terminal of the assembly of all the cells 41 connected in series with the control board 12. Similarly, the bus bar 66 is used as a connector to connect a negative terminal of the assembly of all the cells 41 to ground. Specifically, the bus bar 61 is joined to the positive terminal 51 of one of outer two of the series-connected cells 41 and has terminals 61x extending from an end thereof far away from the connection to the positive terminal 51 for electric connection with the control board 12. The terminals 61x extend from the bus bar 61 in an upward direction of the assembled battery module 11. The bus bar 66 is joined to the negative terminal 52 of the other outer one of the series-connected cells 41 and has a terminal 66x extending from an end thereof far away from the connection to the negative terminal 52 for electric connection with ground (i.e., the body of the vehicle).

The bus bars 61 to 66 have respective voltage detecting terminals 61a to 66a formed integrally. The voltage detecting terminals 61a to 66a extend away from the cells 41.

The insulating cover 43, as illustrated in FIG. 12, also has a plurality of (five in this embodiment) openings 68 each of which faces one of the gas release valves 53 of the cells 41. The insulating cover 43 has rectangular recesses 69 one for each of the cell groups G1 and G2. The recesses 69 are formed in an outer end of the insulating cover 53 and, as can be seen in FIG. 12, surround the openings 68. Seals or gaskets 71 and 72 are fit in the recesses 69, respectively. The gaskets 71 and 72 have a total of five openings 73. When the gaskets 71 and 72 are fit in the recesses 69 of the insulating cover 43, the openings 73 coincide with the openings 68 of the insulating cover 43.

The insulating cover 43 is made from an electrical insulating material or synthetic resin such as polypropylene resin or polypropylene resin containing fillers or talc. The insulating cover 43 may be made from heat resisting or heat insulating synthetic resin.

The assembling of the battery case 42 and the insulating cover 43 is made using a plurality of mounting members or clips 75. Specifically, each of the battery case 42 and the insulating cover 43 has protrusions. Each of the clips 75 holds or grips the protrusions of the battery case 42 and the insulating cover 43 to join them firmly.

Exhaust Air Duct 44

Figure 16:
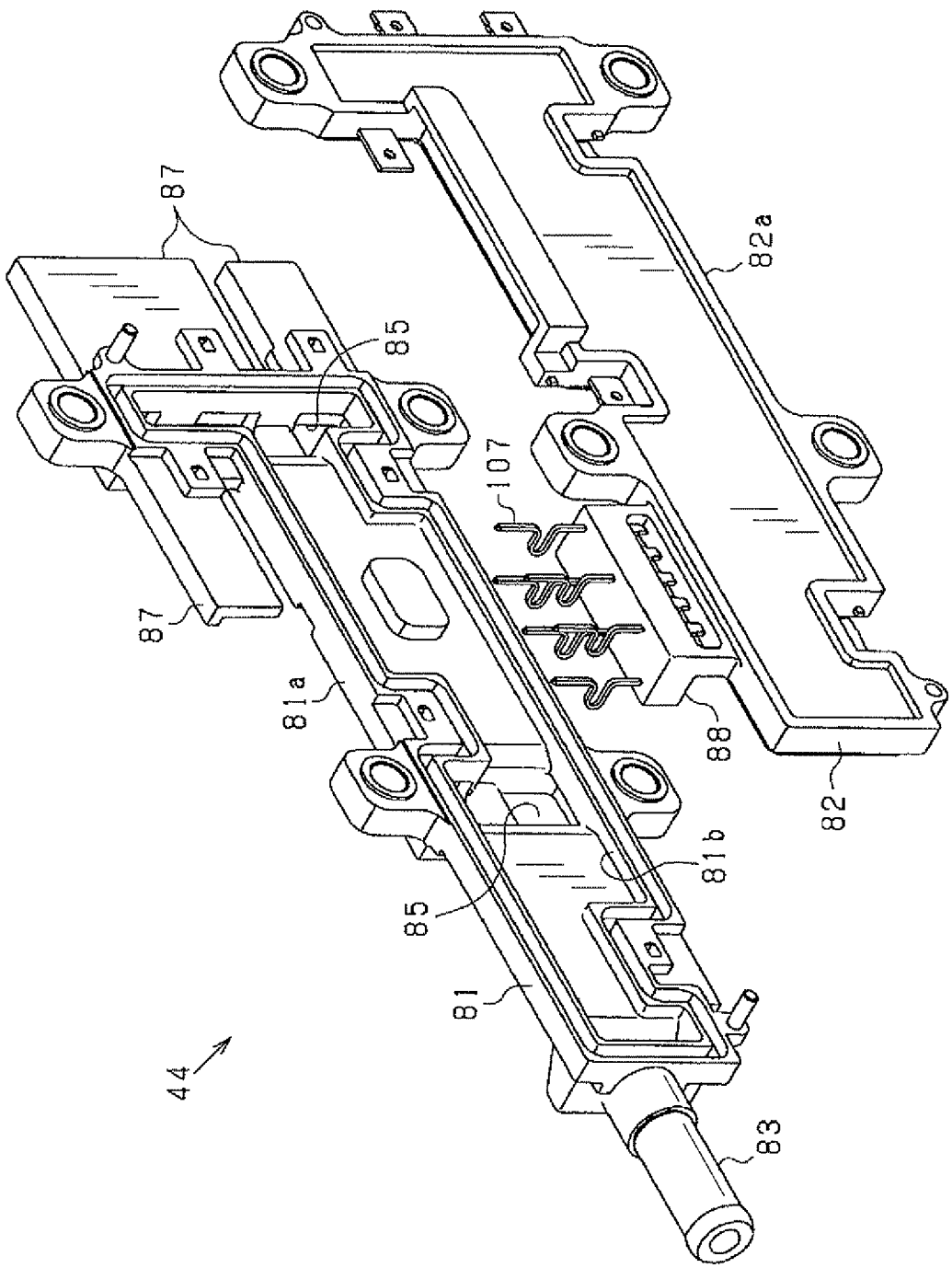
FIG. 16 is an exploded perspective view which illustrates an exhaust air duct of the battery unit of FIG. 1.

The structure of the exhaust air duct 44 will be described below. FIG. 16 is an exploded perspective view of the exhaust air duct 44.

The exhaust air duct 44 is equipped with a collection chamber for collecting gas or electrolyte solution emitted from the cells 41 when the gas release valves 53 are opened. Specifically, the exhaust air duct 44 includes a first body 81 and a second body 82 to define the collection chamber. The first body 81 is located closer to the cells 41 than the second body 81 is. Each of the first and second bodies 81 and 82 is made of heat resistant material which withstands hot gas or electrolyte solution flowing out of the gas release valves 53 when the pressure in the cell 41 exceeds the upper limit. For example, each of the first and second bodies 81 and 82 is made of polyphenylene sulfide (PPS), polybutylene terephthalate (PBT), or resin to which flame retardant is added. The exhaust air duct 44 is preferably made of heat insulating synthetic resin.

Either or both of the first and second bodies 81 and 82 have formed therein a recess which defines the collection chamber. For instance, the first body 81, as illustrated in FIG. 16, has a recess 81b formed in a main body 81a. The first and second bodies 81 and 82 are attached to each other to define the collection chamber in the recess 81b. A heat resisting seal is disposed in a joint of the first and second bodies 81 and 82.

The first body 81 has integrally formed thereon a gas outlet port 83 which leads to the collection chamber in the exhaust air duct 44. The gas outlet port 83 works to emit the gas or electrolyte solution captured in the collection chamber in the exhaust air duct 44 outside the battery unit 10.

The first body 81 has five openings 85 formed therein in coincidence with the gas release valves 53 of all the cells 41. When the exhaust air duct 44 is attached to the insulting cover 43, the gas release valves 53 are exposed to the openings 85 of the first body 81 through the openings 68 and 73 of the insulating cover 43 and the gaskets 71 and 72. The gaskets 71 and 72 each work as a seal to avoid leakage of gas or liquid from the assembled battery module 11.

The collection chamber (i.e., the recess 81b) of the exhaust air duct 44 has an area great enough to occupy all the gas release valves 53 of the cells 41. The main bodies 81a and 82a are each formed in the shape of a plate and cover some of the bus bars 61 to 66 (i.e., the bus bars 63 and 64, and 65), while the other bus bars (i.e., the bus bars 61, 62, and 66) are not covered with the main bodies 81a and 82a. The first body 81 has a plurality of extension strips 87 extending from the main body 81a to close or cover the bus bars 61, 62, and 66. The extension strips 87 do not fully cover the bus bars 61 and 66.

Specifically, the terminals 61x to be connected to the control board 12 and the terminal 66x to be connected to ground are exposed outside the extension strips 87.

The extension strips 87 function as protectors to protect the bus bars 61, 62, and 66 from physical impact. For instance, the extension strips 87 work to avoid hits of tools or parts of the assembled battery module 11 during assembling of the assembled battery module 11.

The insulating cover 43, as illustrated in FIG. 12, has a plurality of (four in this embodiment) connecting bars 91. The exhaust air duct 44 has a plurality of connecting protrusions 92 with through holes. The connecting bars 91 extend away from the cells 41 and have external threads formed on tops thereof. The joining of the exhaust air duct 44 to the insulating cover 43 is achieved by inserting the connecting bards 91 through the connecting protrusions 92 and tightening nuts 93 onto the external threads of the connecting bards 91.

Figure 17:
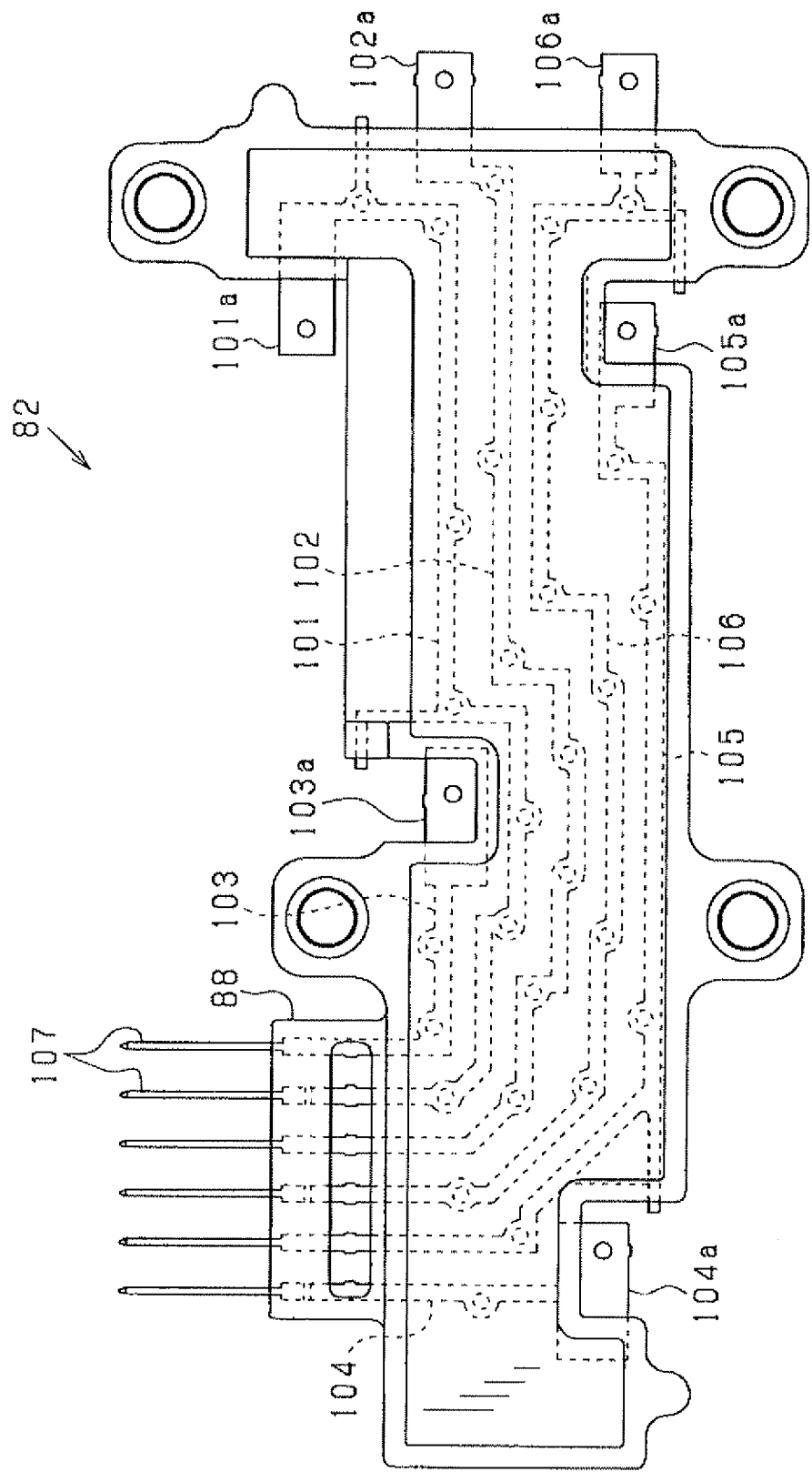
FIG. 17 is a view which shows a layout of metallic conductors printed on a second body of the exhaust air duct of FIG. 16.

The exhaust air duct 44 is equipped with voltage output paths, one for each of the bus bars 61 to 66, through which terminal voltages, as developed at the cells 41, are outputted to the control board 12. Specifically, the second body 82, as illustrated in FIG. 17, has metallic conductors 101 to 106 insert-molded therein. The metallic conductors 101 to 106 define the voltage output paths to transmit the terminal voltages, as picked up at voltage terminals 61a to 66a of the bus bars 61 to 66, respectively, to the control board 12. Each of the metallic conductors 101 to 106 is made of a flat strip which is rectangular in transverse cross section thereof and may be formed by punching a highly conductive copper plate.

The metallic conductors 101 to 106 are equipped with electrode-side connecting terminals 101a to 106a at ends thereof. The connecting terminals 101a and 106a are coupled the bus bars 61 to 66, respectively. The connecting terminals 101a to 106a are arranged separately according to layout of the voltage terminals 61a to 66a. Specifically, the connecting terminal 101a is located in alignment with the voltage terminal 61a. The connecting terminal 102a is located in alignment with the voltage terminal 62a. The connecting terminal 103a is located in alignment with the voltage terminal 63a. The connecting terminal 104a is located in alignment with the voltage terminal 64a. The connecting terminal 105a is located in alignment with the voltage terminal 65a. The connecting terminal 106a is located in alignment with the voltage terminal 66a.

The connecting terminals 101a to 106a extend outwardly from the second body 82 and have holes through which the voltage terminals 61a to 66a pass to establish electric connections with the connecting terminals 101a to 106a. The joining between the voltage terminals 61a to 66a and the connecting terminals 101a to 106a may be made through soldering, welding, or bonding or using screws.

Figure 19A:
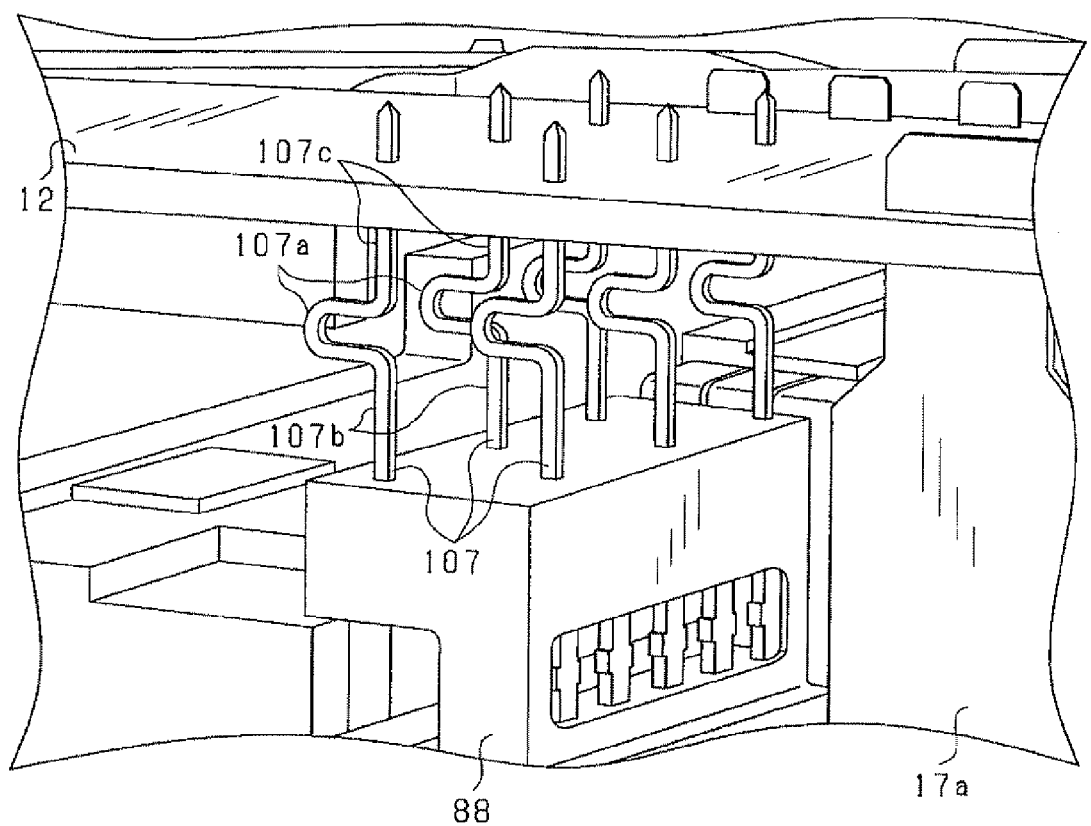
FIG. 19(a) is an enlarged partial perspective view which shows control board-side connecting terminals.
Figure 19B:
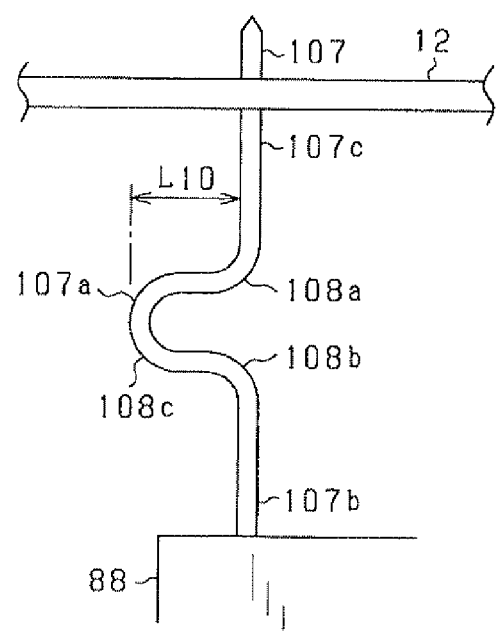
FIG. 19(b) is a side view which illustrates one of the control board-side connecting terminals of FIG. 19(a)

The metallic conductors 101 to 106 include as many control board-side connecting terminals 107 as the metallic conductors 101 to 106. Each of the control board-side connecting terminals 107 is made of a metallic bar which is square or circular in transverse cross section. The control board-side connecting terminals 107 are retained substantially in parallel in a terminal holder 88 formed on an upper end of the second body 82. The control board-side connecting terminals 107 are arranged in a plurality of arrays (two arrays in this embodiment) each of which is made up of, for example, three of them. Each of the control board-side connecting terminals 107 extends vertically upward and has a top end coupled to the control board 12. Each of the control board-side connecting terminals 107 is made of an elastically deformable material and, as can be seen in FIGS. 19(a) and 19(b), has a U-shaped bend 107a which is formed by a portion of a length thereof and will deform when subjected to mechanical impact. The bend 107a will be described later in detail.

The control board-side connecting terminals 107 are preferably joined to the metallic conductors 101 to 106, respectively. Such joints are preferably achieved by using welding or mechanical clamping techniques. The control board-side connecting terminals 107 may alternatively be formed integrally with the metallic conductors 101 to 106, respectively.

Control Board 12

Figure 18:
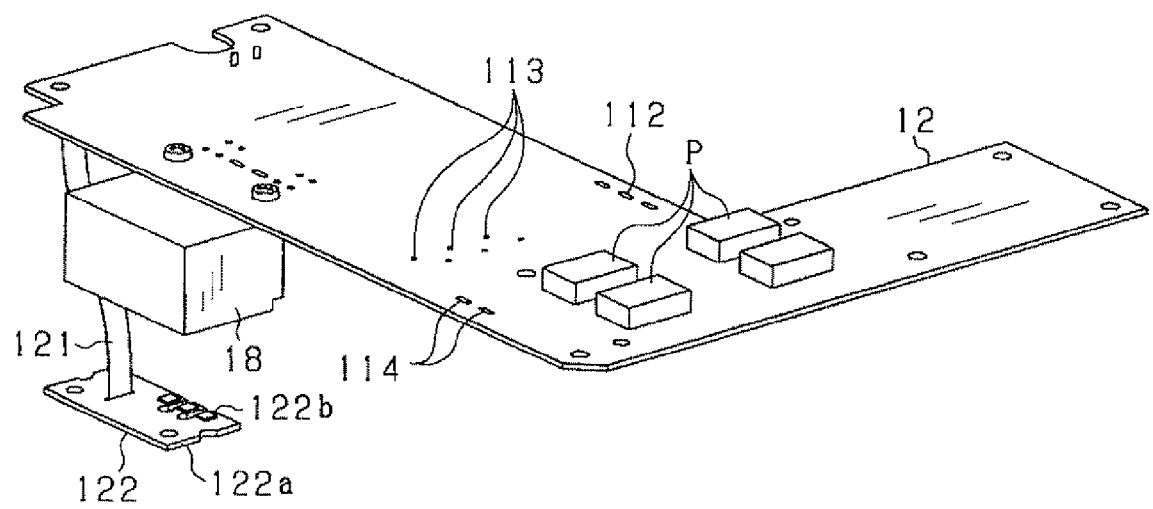
FIG. 18 is a perspective view which illustrates a control board and its associated parts.

The control board 12 will be described below. FIG. 18 is a perspective view which illustrates the control board 12 and its associated parts. The control board 12 is, as described above, installed in the battery unit 10 (see FIGS. 2, 3, and 6).

The control board 12 is, as can be seen from the drawing, made of a printed circuit board which is of a U-shape (i.e., polygonal in shape). The control board 12 has a variety of electronic devices mounted on a major surface thereof and is equipped with an electric connector 18 affixed thereto. Specifically, the control board 12 is equipped with a CPU (i.e., an arithmetic device) working as controller to perform a given control task to control charging or discharging of the assembled battery module 11 and the above described power devices P. The control board 12 has two areas: an overlap area which is laid to overlap with the assembled battery module 11 vertically, that is, arranged just above the assembled battery module 11 in the vertical direction thereof and a non-overlap area which is located out of coincidence with the assembled battery module in the vertical direction. The power devices P are fabricated on the non-overlap area. The power device heat dissipater 28 is, thus, as illustrated in FIGS. 3 and 6, oriented to face the non-overlap section of the control board 12 on which the power devices P are mounted, thereby facilitating the release of heat, as generated by the power devices P, outside the assembled battery module 11 through the power device heat dissipater 28.

Figure 4:
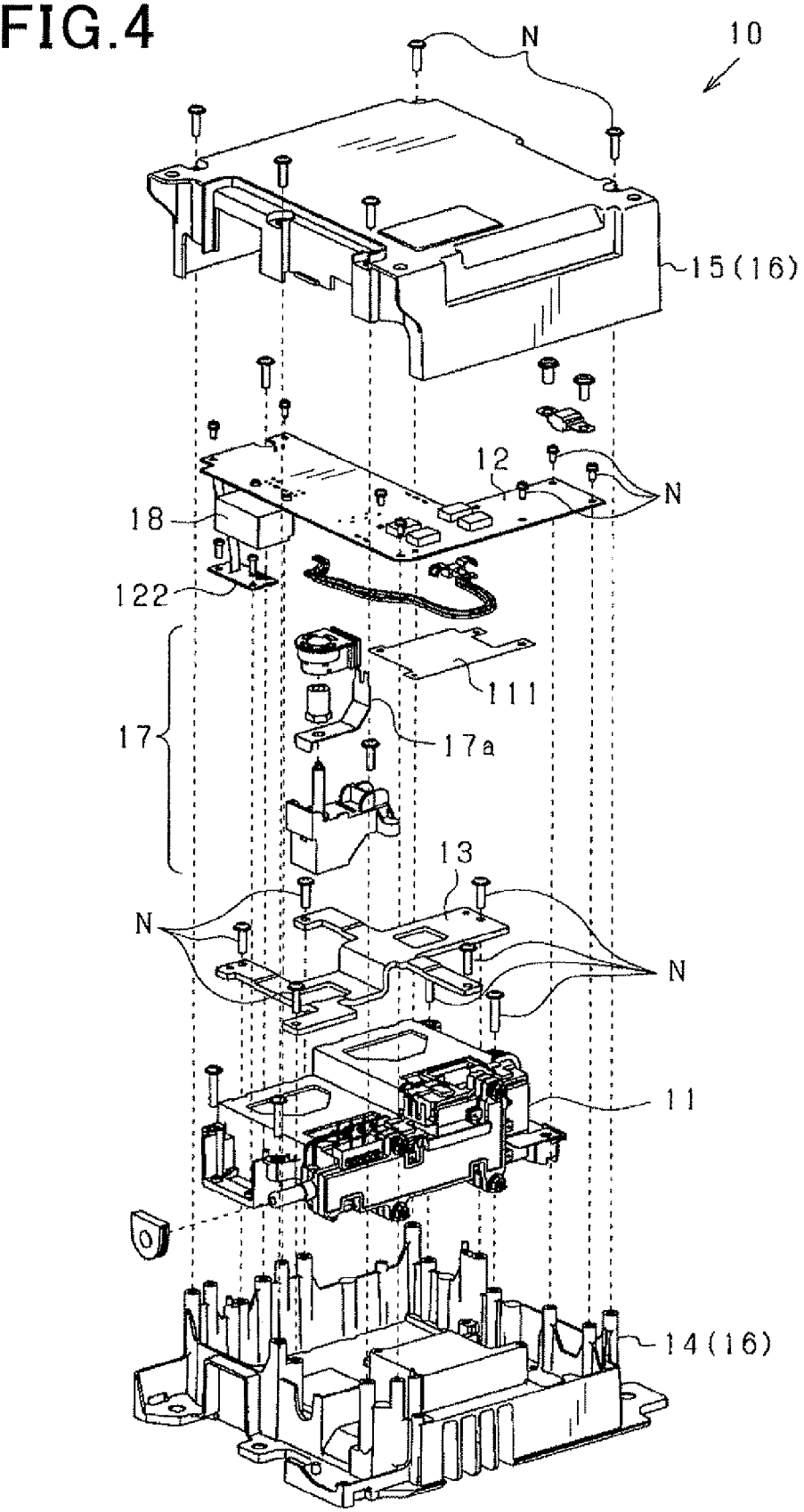
FIG. 4 is an exploded perspective view of the battery unit of FIG. 1.

Insulating sheet 111 is interposed between the board-facing plate 29 of the power device heat dissipater 28 and the control board 12 to electrically insulate the power device heat dissipater 28 and the control board 12 from each other (see FIGS. 4 and 5). The control board 12 is the opposite side of the assembled battery module 11 to the bottom plate 21. In other words, the assembled battery module 11 intervenes between the control board 12 and the bottom plate 21.

The control board 12 has through holes 112, 113, and 114 formed therein. The terminals 61x of the bus bar 61 are, as illustrated in FIG. 6, fit in the through holes 112. The control board-side connecting terminals 107 are fit in the through holes 113. The bus bars 17a of the terminal block 17 are fit in the through holes 114. These terminals are soldered into the through holes 112, 113, and 114. The control board-side connecting terminals 107 are fixed in the through holes 113, so that they electrically connect with a voltage detector fabricated in the control board 12.

The through holes 113 are formed in the overlap area of the control board 12 which is vertically located just above the assembled battery module 11. Specifically, the assembled battery module 11, as described above, includes the triple stacked cell group G1 made up of a stack of three of the cells 41 and the double stacked cell group G2 made up of a stack of the remaining two cells 41. The through holes 113 are located just above the double stacked cell group G2. The double stacked cell group G2 is lower in level than the triple stacked cell group G1 to form, as described above, the shoulder Z, thereby defining above the assembled battery module 11 the space for the board-side connecting terminals 107.

In the case where the battery unit 10 is mounted in the vehicle, the assembled battery module 11 and the control board 12 usually undergoes mechanical vibration or a change in ambient temperature, so that they may be changed in positional relation therebetween. The assembled battery module 11 and the control board 12 are separately joined to the base 14 of the case 16, respectively, through the screws N. This means that the assembled battery module 11 and the control board 12 are retained firmly by the base 14, but are susceptible to a change in positional relation therebetween, thus causing removal or fracture of the solders on the control board-side connecting terminals 107.

In order to avoid the above drawback, each of the control board-side connecting terminals 107 is, as described above with reference to FIGS. 19(a) and 19(b), partially curved to form the U- or C-shaped bend 107a which bulges in a direction traversing the length thereof. The bends 107a of all the control board-side connecting terminals 107 protrude in the same direction. Each of the control board-side connecting terminals 107 includes a lower portion 107a (also referred to as a base-side upright portion) which is below the bend 107a and an upper portion 107c (also referred to as a top-side upright portion) which is above the bend 107a. The lower portion 107b and the upper portion 107c extend in the vertical direction of the battery unit 10, in other words, they are aligned straight with each other in a direction perpendicular to the surface of the control board 12.

Each of the bends 107, as can be seen in FIG. 19(b), includes three arc-shaped sections: an upper arc 108a, a lower arc 108b, and a middle arc 108c between the upper and lower arcs 108a and 108b. The upper and lower arcs 108a and 108b bulge in substantially the same direction, while the middle arc 108c bulges in a direction opposite the upper and lower arcs 108a and 108b. Each of the upper, lower, and middle arcs 108a, 108b, and 108c is preferably designed to have a radius of curvature which is selected so as not to cause the excessive concentration of stress when the control board-side connecting terminal 107 is subjected to compression or tension. In this embodiment, the radius of curvature of each of the upper, lower, and middle arcs 108a, 108b, and 108c is set greater than the thickness (or the diameter) of the control board-side connecting terminals 107.

The upper, lower, and middle arcs 108a, 108b, and 108c are so designed as to avoid the concentration of stress on any one of them. Specifically, the radii of curvature of the upper, lower, and middle arcs 108a, 108b, and 108c are substantially identical with each other, thereby minimizing the concentration of bending stress on any one of them when the vibration acts on the control board-side connecting terminal 107, so that the stress is exerted thereon. This protects the control board-side connecting terminals 107 from being damaged.

The length L10 of each of the bends 107a, that is, the distance between the top of the band 107 and the surface of the upper portion 107c (or the lower portion 107b of the control board-side connecting terminal 107 in a direction perpendicular to the length of the control board-side connecting terminal 107 is set smaller than the distance between adjacent two of the control board-side connecting terminals 107 on the surface of the control board 12 and/or the surface of the terminal holder 88 in order to avoid mechanical interference between the control board-side connecting terminals 107.

The upper surface of the assembled battery module 11, as already described with reference to FIG. 2, has the step to define the shoulder Z which produces two different distances between the bottom plate 21 and the upper surface. The space is created between the shoulder Z (i.e., the lower area of the upper surface of the assembled battery module 11) and the control board 12. The control board-side connecting terminals 107 are laid within the space. In other words, the control board-side connecting terminals 107 are disposed above the double stacked cell group G2 which is lower in height than the triple stacked cell group G1.

The control board 12 has an overlap with the assembled battery module 11 in the vertical direction, but the assembled battery module 11 is, as described above, designed to create a chamber between the upper surface thereof and the lower surface of the control board 12 which is great enough for the layout of the bends 107a of the control board-side connecting terminals 107, thereby permitting the bends 107a to work as a damper or shock absorber to absorb the vibration or pressure acting on the control board-side connecting terminals 107. Specifically, if the control board 12 is located close to the assembled battery module 11, it results in a difficulty in laying out the bends 107a of the control board-side connecting terminals 107 therebetween. In order to alleviate this problem, the assembled battery module 11 is designed to have the stepped upper surface to create the chamber great enough to store the control board-side connecting terminals 107 with the bends 107a.

The bends 107a of the control board-side connecting terminals 107, as described above, function to deform to absorb the compressive or tensile stress acting thereon which arises from approach or separation, that is, a shift in location between the control board 12 and the assembled battery module 11. The bends 107a also work to a shift in location between the control board 12 and the assembled battery module 11 in the horizontal direction (i.e, a direction parallel to the surface of the control board 12). This minimizes undesirable exertion of mechanical load on either of the control board 12 and the assembled battery module 11.

The installation of the control board 12 in the battery unit 10 is achieved by inserting the control board-side connecting terminals 107 into the holes 113 of the control board 12 and then securing the control board 12 to the base 14. If there are errors in dimension of the parts of the control board 12 or the battery unit 10, it leads to concern about a failure in inserting the control board-side connecting terminals 107 into the holes 13 or excess exertion of mechanical load on the control board-side connecting terminals 107. The bends 107a of the control board-side connecting terminals 107, however, serve to eliminate such drawbacks.

The control board 12 is coupled to the water damage sensor 122 through electric wires 121. The water damage sensor 122 monitors the entry of water into the battery unit 10 as indicating the immersion of the battery unit 10 in water. The water damage sensor 122, as illustrated in FIG. 18, includes a base plate 122a and a water sensitive device 122b mounted on the base plate 122a. The installation of the water damage sensor 122 on the sensor mount 59 of the battery case 42 is, as clearly illustrated in FIG. 2, achieved by fixing the base plate 122a on the sensor mount 59.

The location of the water damage sensor 122 mounted on the control bard 12 in the battery unit 10 will be described below. The water damage sensor 122 is disposed on the sensor mount 59 formed integrally with the battery case 42, so that it is located at a level lower than the upper end of the fence plate 23 of the upright wall 22 within a case chamber surrounded by the upright wall 22, in other words, positioned closer to the bottom plate 21 than the upper end of the upright wall 2 is. The control board 12 is fixed on the upper ends of the cylindrical supports 24 of the upright wall 22, so that it is located at a level higher than the upper end of the fence plate 23, in other words, farther away from the bottom plate 21 than from the upper end of the upright wall 22. Accordingly, the water damage sensor 122 is located at a level lower than an upper limit at which water is permitted to be stored in the case chamber enclosed by the upright wall 22, while the control board 12 is located at a level higher than the upper limit.

Referring to FIG. 2, the fence plate 23 of the upright wall 22 has a height H1 from the bottom surface (i.e., an outer surface of the bottom) of the battery unit 10. The water damage sensor 122 has a height H2. The height of the control board 12 has a height H3. The heights H1, H2, and H3 have relations of H2<H1, and H3>H1. If the vehicle goes in water, so that the battery unit 10 is submerged, the water does not enter the case chamber until the level of the water is greater than the height H1 of the upright wall 22. When the level of the water exceeds the height H1, the water will enter the case chamber, thus causing the water damage sensor 122 to detect such an event. At the time when the water starts to enter the case chamber, the control board 12 is not yet immersed in the water, thus permitting the CPU (i.e., the controller) on the control board 12 to perform given tasks to, for example, stop charging or discharging the assembled battery module 11 in response to an output from the water damage sensor 122 before the battery unit 10 breaks down due to the immersion of the CPU in the water.

The control board 12 is higher than the upper end of the fence plate 23, so that a clearance which is equivalent to a difference of H3-H1 is, as can be seen in FIG. 2, created between the upper end of the fence plate 23 and the control board 12. This causes the water to get in the case chamber through the clearance. The water damage sensor 122 detects the entry of water into the case chamber before the level of water reaches the control board 12.

The base 14 and the cover 15 of the storage case 16 form a double-wall structure, as clearly illustrated in FIGS. 2 and 3, in which the upright wall 22 of the base 14 is located inside the side wall 36 of the cover 15. Therefore, when the battery unit 10 is slightly made wet or splashed with water, the water damage sensor 122 does not detect the entry of water into the case chamber, thus ensuring the continuity of operation of the assembled battery module 11.

Press Plate 13

Figure 20A:
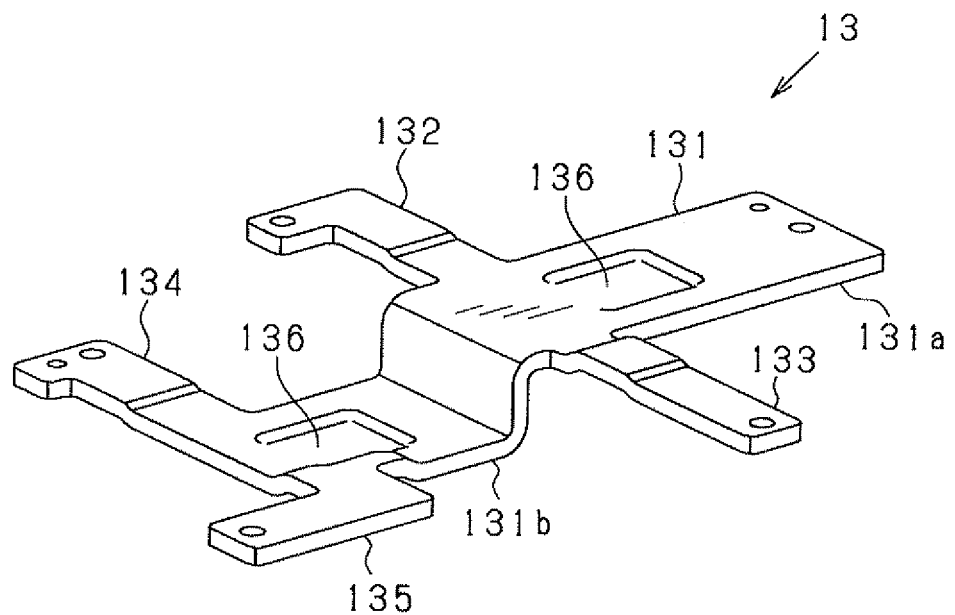
FIG. 20(a) is a perspective view which illustrates a press plate working as a swell limiter to suppress swelling of cells of the assembled battery module of FIG. 10.
Figure 20B:
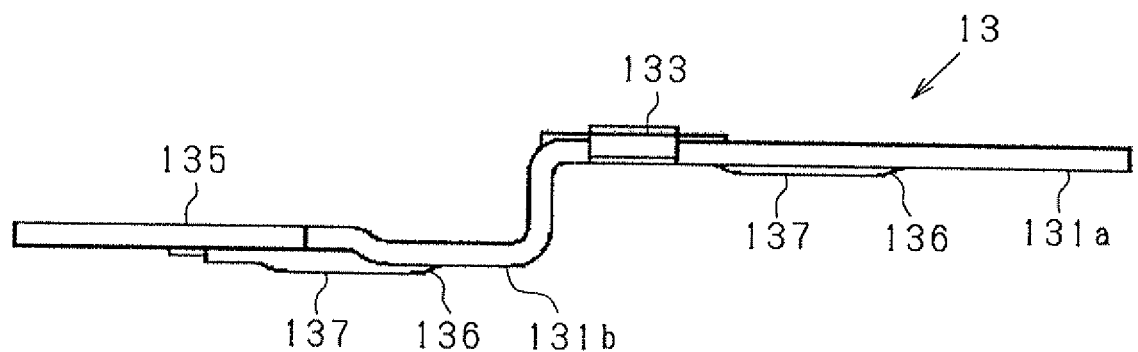
FIG. 20(b) is a side view of the press plate of FIG. 20(a)

The structure of the press plate 13 will be described below. FIGS. 20(a) and 20(b) illustrate the press plate 13. The press plate 13 is disposed in the battery unit 10 in the manner, as illustrated in FIGS. 2, 5, and 6.

The press plate 13 is made of a high rigidity metallic plate whose thickness is about several mm. The press plate 13 includes a stepped strip 131 and arms 132, 133, 134, and 135. The stepped strip 131 has a given length extending in a direction in which the upper surface of the assembled battery module 11 (i.e., the battery case 42) is stepped, in other words, the triple stacked cell group G1 and the double stacked cell group G2 are arrayed. The arms 132 to 135 extend laterally from the stepped strip 131. The press plate 13 is stepped or contoured to conform with the contour of the stepped upper surface of the assembled battery module 11. Specifically, the stepped strip 131 is made up of an upper stepped portion 131a and a lower stepped portion 131b. An end of the upper stepped portion 131a and ends of the arms 132 to 135 are used as attachments for fixing the press plate 13 to the base 14. Specifically, the end of the upper stepped portion 131a and the ends of the arms 132 to 135 have, as illustrated in FIG. 20(a), holes through which screws passé to join the press plate 13 to the base 14. The joining of the press plate 13 to the base 14 is achieved by placing the end of the upper stepped portion 131a and the ends of the arms 132 to 135 on the upper ends of the cylindrical supports 24 of the base 14 and screwing them to the base 14. The press plate 13 is, therefore, placed in contact with the upright wall 22 and the cylindrical mounts 25 of the base 14 which surround the assembled battery module 11.

The press plate 13 is designed as both a swell limiter and a heat dissipater. The swell limiter works to limit undesirable swelling or deformation of the cells 41 of the assembled battery module 11. The heat dissipater works to release heat, as generated by the assembled battery module 11 or the control board 12.

The operation of the swell limiter will be described below. The swell limiter is realized not only by the press plate 13, but also by the base 14 and the battery case 42. The following discussion will, therefore, also refer to the base 14 and the battery case 42.

The stepped strip 131 of the press plate 13 has two tabs 136 which bulge or protrude away from one of opposed surfaces thereof. The tabs 136 are so located as to face the triple stacked cell group G1 and the double stacked cell group G2, respectively. Specifically, each of the upper stepped portion 131a and the lower stepped portion 131b of the press plate 13 has one of the tabs 136. When the press plate 13 is joined to the base 14, the tabs 136 are so oriented to protrude toward the assembled battery module 11 and have flat stopper surfaces 137 which make physical touches or contacts with the surface of the assembled battery module 11 (i.e., a bulging portion of one of the surfaces of the assembled battery module 11 which is on the opposite side of the bottom plate 21) when the cells 41 have swollen. Additionally, the bottom plate 21 of the base 14, as already described in FIG. 8(a), includes the protrusions 32 with the stopper surfaces 33 with which the assembled battery module 11 (i.e., a bulging portion of one of the surfaces of the assembled battery module 11 which faces the bottom plate 21) makes physical contact when the cells 41 have swollen.

The protrusions 32 of the base plate 14 will also be referred to below as first protrusions or lower protrusion. The tabs 136 of the press plate 13 will also be referred to below as second protrusions or upper protrusions.

The upper protrusions 136 and the lower protrusions 32 are, as clearly illustrated in FIG. 2, located vertically on the opposite sides of the assembled battery module 11 when the assembled battery module 11 and the press plate 13 are mounted on the base 14. Specifically, the lower protrusions 32 are placed in abutment with a portion of the lower plate 55a of the battery case 42 which faces the center of the lower surfaces of the cells 41, while the upper protrusions 136 are placed in abutment with a portion of the upper plate 55b of the battery case 42 which faces the center of the upper surfaces of the cells 41.

When none of the cells 41 are swollen, the upper plate 55b of the battery case 42 is, as illustrated in FIG. 2, separate from the upper protrusions 136 of the press plate 13 through an air gap. The air gap is, for example, 0.3 mm to 1.0 mm. The lower protrusions 32 of the base 14 are placed in direct contact with the lower plate 55a of the battery case 42.

The cells 41 of the assembled battery module 11 are, as described above, stacked in the thickness-wise direction thereof. When one of the cells 41 swells, the size of such a swell is usually maximized at the centers of the upper and lower surfaces of the cell 41. The lower plate 55a of the battery case 42 is kept in contact with the lower protrusions 32 of the base 14. Within the air gap between the upper plate 55b of the battery case 42 and the upper protrusions 136 of the press plate 13, the cell 41 is permitted to swell. When the size of such a swell exceeds that of the air gap, it will cause the upper plate 55b of the battery case 42 to touch the upper protrusions 136 of the press plate 13. The press plate 13 is, as described above, made of material which has a degree of rigidity high enough to withstand elastic deformation thereof when subjected to the pressure arising from the swelling of the cell 41. The cell 41, therefore, stops swelling when the upper plate 55b of the battery case 42 touches the upper protrusions 136, thereby avoiding an excess of swelling of the cell 41.

The interval between the battery case 42 and the press plate 13 changes between around a portion of the battery case 42 which will expand most greatly when any of the cells 41 in each of the triple stacked cell group G1 and the double stacked cell group G2 swells and another portion of the battery case 42. Specifically, the interval is minimized at the portions of the battery case 42 which will expand most greatly. In other words, the press plate 13 is so shaped as to have a first distance and a second distance different from the first distance between the lower surface of the press plate 13 and the upper surface of the battery case 42 (i.e., the battery body Y). The first distance is a minimum interval between the lower surface of the press plate 13 and an area of the upper surface of the battery case 42 (i.e., the battery body Y) which covers a portion of the cells 41 expected to expand most greatly (i.e., a central area of the surface of the cells 41) in each of the triple stacked cell group G1 and the double stacked cell group G2. The second distance is a minimum interval between the lower surface of the press plate 13 and another area of the upper surface of the battery case 42. The first distance is set smaller than the second distance. In this embodiment, the press plate 13 is, as described above, equipped with the upper protrusions 136. Therefore, when any of the cells 41 in one of the triple stacked cell group G1 and the double stacked cell group G2 has swollen, the flat surface 137 of a corresponding one of the upper protrusions 136 will first touch the upper surface of the battery case 42. The surfaces 33 of the lower protrusions 32 are usually placed at a given interval (e.g., 0.3 mm to 1.0 mm) away from the lower surface of the battery case 42. When any of the cells 41 in one of the triple stacked cell group G1 and the double stacked cell group G2 has swollen, the surface 33 of a corresponding one of the lower protrusions 32 makes physical contact with the lower surface of the battery case 42 to suppress the expansion thereof. In this manner, the amount by which the battery case 42 expands when the cells 41 swell is limited.

The battery case 42, as described above, has the partition plates 56 each of which is interposed between vertically adjacent two of the cells 41. The partition plates 56 isolate the cells 41 physically from each other and also work as a swell limiter to stop or limit swelling of the cells 41.

The operation of the press plate 13 as the heat dissipater will be described below. The press plate 13, as can be seen in FIG. 2, extend along the upper surface of the assembled battery module 11. The press plate 13, as described above, includes the upper stepped portion 131a and the lower stepped portion 131b. The lower stepped portion 131b is laid over the double stacked cell group G2 and intervenes between the assembled battery module 11 and the control board 12. The upper stepped portion 131a is laid over the triple stacked cell group G1 and extend substantially parallel to the control board 12 at the same level as the control board 12. In other words, the upper stepped portion 131a extends horizontally in alignment with the control board 12. The end of the upper stepped portion 131a and the ends of the arms 132 to 135 are screwed onto the upper ends of the cylindrical supports 24 of the base 14. This causes the heat, as generated by the assembled battery module 11 and the control board 12, to escape to the upright wall 22 of the base 14 through the press plate 13. The press plate 13 forms a heat releasing path along with the upright wall 22 and works as a heat dissipater to release the heat to the outside.

The heat, as transmitted to the upright wall 22 through the press plate 13, further travels to the bottom plate 21 and then dissipates into the air through the ribs 27 of the bottom plate 21 and also to the body of the vehicle through the bottom plate 21.

As described above, the press plate 13 working as a heat dissipater is disposed between the assembled battery module 11 and the control board 12, thus minimizing mutual adverse effects of heat on the assembled battery module 11 and the control board 12.

Heat Control Structure in Storage Case 16

The cells 41 and the power devices P are considered as heat sources which are greater in amount of heat released in the component parts of the battery unit 10. The battery unit 10 of this embodiment is designed to minimize adverse thermal effects from the cells 41 on the power devices P or vice versa and will be described below in detail.

The control board 12, as illustrated in FIG. 2, includes a first board section X1 which has an overlap area laid to overlap with the assembled battery module 11 vertically, that is, arranged just above the assembled battery module 11 in the vertical direction thereof and a second board section X2 which has a non-overlap area located out of coincidence with the assembled battery module in the vertical direction. The power devices P are fabricated on the second board section X2. The power devices P are not arranged above the cells 41 in the vertical direction of the battery unit 1, but located out of overlap with the cells 41 vertically, in other words, separate from the cells 41 laterally.

The power device heat dissipater 28 is disposed on a lower surface of the second board section X2 which is opposed to an upper surface thereof on which the power devices P are mounted. The power device heat dissipater 28 is located adjacent the assembled battery module 11 in a lengthwise direction (i.e., a lateral direction in FIG. 3) of the control board 12. More specifically, the assembled battery module 11 is so oriented within the storage case 16 to make the insulating cover 43 and the exhaust air duct 44 face the power device heat dissipater 28.

The heat, as generated by the cells 41, is transmitted directly to the bottom plate 21 of the base 14 and also to the bottom plate 21 through the press plate 13 and the upright wall 22 and then released outside the battery unit 10. The heat, as generated by the power devices P, is released outside the battery unit 10 through the power device heat dissipater 28. Specifically, there is two separate heat dissipating paths one for each of the set of the cells 41 and the set of the power devices P. The power devices P are laid on the control board 12 not to overlap with the assembled battery module 11. This minimizes the mutual adverse thermal effects on the cells 41 and the power devices P.

The insulating cover 43 and the exhaust air duct 44 are disposed on the end of the assembled battery module 11 which is closer to the power devices P. In other words, the synthetic resin-made insulating cover 43 and the exhaust air duct 44 are interposed between the set of the cells 41 and the power device heat dissipater 28. The insulating cover 43 and the exhaust air duct 44 serve as a heat shield to block transmission of heat between the cells 41 and the power devices P. Specifically, the transmission of heat, as generated by the cells 41, to the power devices P is minimized, while the transmission of heat, as generated by the power devices P, to the cells 41 is minimized. This alleviates the mutual adverse thermal effects on the cells 41 and the power devices P.

The heat, as produced by the assembled battery module 11, is also transmitted to the power device heat dissipater 28. The power device heat dissipater 28 is equipped with the fins 30 which, as illustrated in FIGS. 5 and 8, extend away from the assembled battery module 11. Each of the fins 30 has a lateral edge face and a lower edge face. The lateral edge faces of the fins 30 are laid in flush with the upright wall 22, while the lower edge faces of the fins 30 are laid in flush with the lower surface of the bottom plate 21 of the base 14. The lateral edge faces are separate from each other. Similarly, the lower edge faces are separate from each other. The heat, as transmitted from the assembled battery module 11 to the power device heat dissipater 28, transfers from a portion of each of the fins 30 closer to the assembled battery module 11 to a portion of each of the fins 30 farther away from the assembled battery module 11 and is then released outside the battery unit 10. The fins 30 are, as described above, joined to the base 14 at the portions closer to the assembled battery module 11 and exposed to the air at the portions farther away from the assembled battery module 11, thus enhancing the effects of releasing the heat to the air.

Electric Structure of Vehicle Power Supply System

Figure 21:
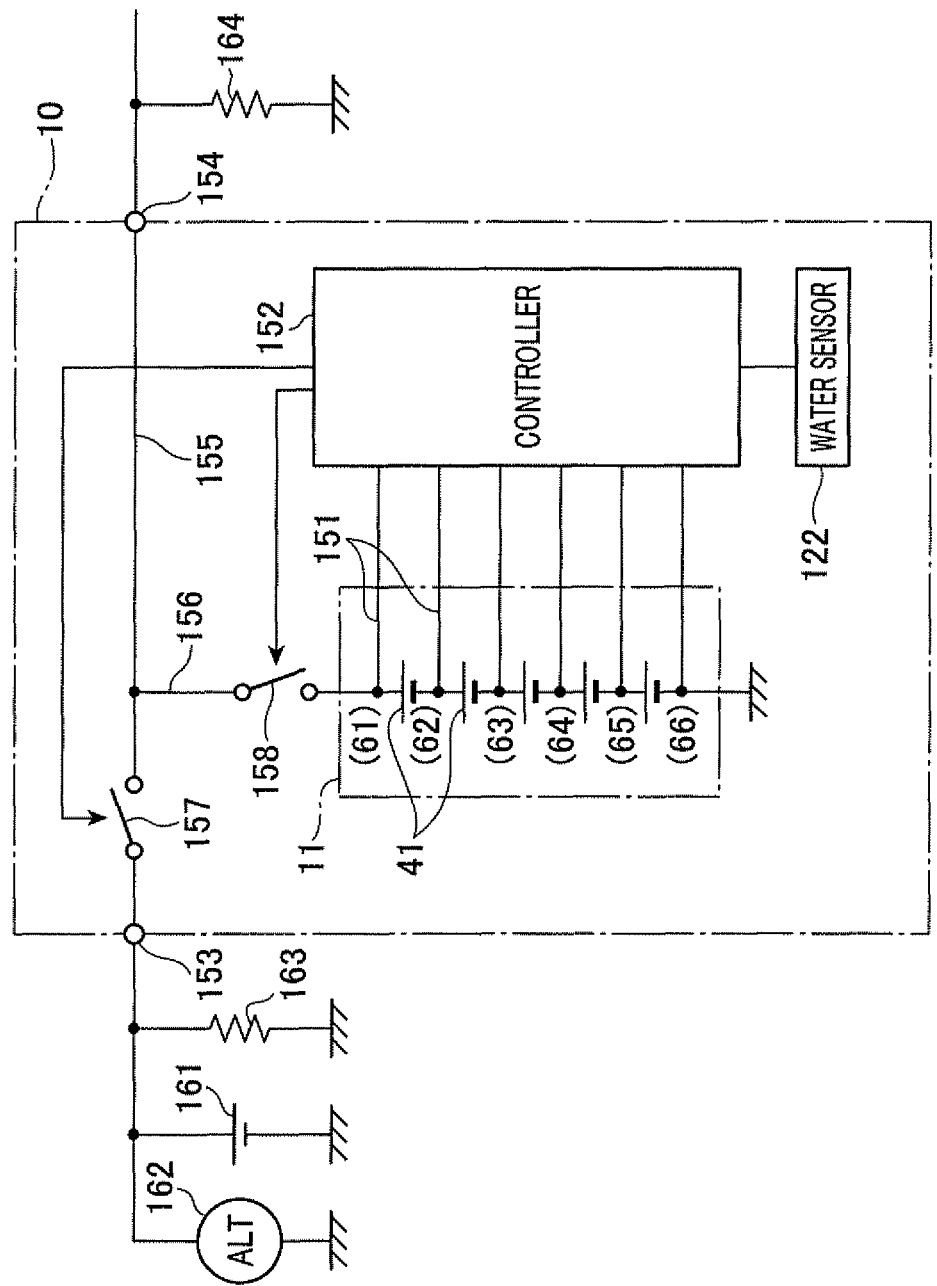
FIG. 21 is a view which illustrates a circuit structure of the battery unit of FIG. 1.

The electric structure of the in-vehicle power supply system will be described below with reference to FIG. 21. The assembled battery module 11 of the battery unit 10 is, as described above, equipped with the five cells 41 connected in series. Each of the cells 41 is connected at the positive and negative terminals thereof to a controller 152 through wires 151. The controller 152 is implemented by a CPU (i.e., an arithmetic device) working to perform a give control task to control the charging or discharging operation of the assembled battery module 11. The controller 152 is mounted on the control board 12. The bus bars 61 to 66, as illustrated in FIG. 12, are connected to the positive and negative terminals of the cells 41. The wires 151 are implemented by the metallic conductors 101 to 106, as illustrated in FIG. 17.

The battery unit 10 is equipped with connecting terminals 153 and 154 which are coupled together through a wire 155. The assembled battery module 11 is connected to a wire 156 diverging from the wire 155. A switch 157 is disposed in the wire 155. A switch 158 is disposed in the wire 156. Each of the switches 157 and 158 functions as a power control switching device made of, for example, a power MOSFET. The switches 157 and 158 correspond to the power devices P, as illustrated in FIG. 6. The water damage sensor 122 is connected to the controller 152.

The power supply system includes a lead-acid storage battery 161 in addition to the battery unit 10. The lead-acid storage battery 161 is coupled to the connecting terminal 153 of the battery unit 10. The battery unit 10 and the lead-acid storage battery 161 are charged by an electric generator (also called an alternator) 162 installed in the vehicle. The vehicle is also equipped with a starter 163 as an electric load which is supplied from electric power from the lead-acid storage battery 161 to start an internal combustion engine mounted in the vehicle. To the battery unit 10, an electric load 164 such as an audio system or a navigation system mounted in the vehicle is coupled through the connecting terminal 154. The battery unit 10 supplies electric power to the electric load 164.

The on/off operation of the switch 157 controlled by the controller 152 will be described briefly. The switch 157 is opened or closed depending upon a state of charge (i.e., an available amount of electric energy) in the assembled battery module 11. Specifically, when the state of charge in the assembled battery module 11 is greater than or equal to a given value K1, the controller 152 turns off the switch 157 to disconnect the connecting terminal 153 and the assembled battery module 11. Alternatively, when the state of charge in the assembled battery module 11 has dropped below the given value K1, the controller 152 turn on the switch 157 to connect the connecting terminal 153 and the assembled battery module 11 to charge the assembled battery module 11 through the generator 162.

When it is required to start the engine using the starter 163, and the state of charge in the lead-acid storage battery 161 is greater than or equal to a given value K2, the controller 152 turns off the switch 157 to supply the electric power from the lead-acid storage battery 161 to the starter 163. Alternatively, when the state of charge in the lead-acid storage battery 161 is less than the given value K2, the controller 152 turns on the switch 157 to supply the electric power from the assembled battery module 11 to the starter 163.

The vehicle on which the power supply system is mounted is equipped with an automatic idle stop system (also called an automatic engine start/restart system) which works to automatically stop the engine when an ignition switch is in the on-state. When a given automatic engine stop condition is met, an ECU (i.e., an idle stop ECU) mounted in the vehicle stops the engine automatically. When a given automatic engine restart condition is met after the stop of the engine, the ECU restarts the engine using the starter 163. The automatic engine stop condition is, for example, a condition where an accelerator of the vehicle has been turned off or released, a brake of the vehicle has been turned on or applied, and the speed of the vehicle is less than a given value. The automatic engine restart condition is, for example, a condition where the accelerator has been turned on, and the brake has been turned off.

Installation of Battery Unit 10

The battery unit 10 is mounted on a floor of the vehicle which defines a passenger compartment. More specifically, the bottom plate 21 of the base 14 is disposed horizontally beneath front seats of the vehicle. The battery unit 10 is in the passenger compartment of the vehicle, so that there is a low possibility that the battery unit 10 is splashed with water or mud as compared with the case where the battery unit 10 is mounted inside an engine compartment of the vehicle. The battery unit 10 may alternatively be placed other than beneath the front seats, for example, in a space between rear seats and a rear luggage compartment.

The above described embodiment offers the following advantages.

The battery unit 10 is equipped with the press plate 13 working as the swell limiter. The press plate 13 is placed in non-contact with the battery case 42 before the cells 41 swell and makes physical contact with the battery case 42 when any of the cells 41 has swollen, thereby rigidly suppressing the swelling of the cell 41. Therefore, before the cells 41 swell, the press plate 13 does not exert an undesirable mechanical load on the cells 41 to keep the cells 41 free from adverse effects of heat or vibration. When any of the cells 41 has swollen, the battery case 42 touches the press plate 13, thereby limiting the swell of the cell 41. In this manner, the press plate 13 works to suppress the undesirable deformation of the cells 41 without increasing the adverse effects of an external factor on the cells 41.

The battery unit 10 is designed to be mounted in the vehicle and thus expected to be always subjected to great or small physical vibrations when the vehicle is running. The press plate 13, as described above, serves to alleviate the adverse effects of the vibrations on the cells 41.

If the press plate 13 is placed in constant abutment with the battery case 42, there may be a risk of exerting stress on the cells 41 which arises from errors in dimension of the battery case 42, etc. In order to eliminate such a problem, the press plate 13 is designed to be separate from the battery case 42 through an air gap.

The press plate 13 is made of a high stiffness material which does not deform elastically when subjected to mechanical pressure created by swelling of the cells 41. The press plate 13 is joined to the upright wall 22 of the base 14 through the screws N. This structure serves to suppress the swelling of the cells 41 on the opposite side of the bottom plate 21 of the base 14.

The press plate 13 is, as described above, equipped with the upper protrusions 136 which bulge toward the assembled battery module 11 and will make contact with the surface of the battery case 42 of the assembled battery module 11 when the cells 41 have swollen. The upper protrusions 136 of the press plate 13 are so located that the minimum distance (i.e., the first distance) between each of the upper protrusions 136 and a given area of the outer surface of the battery case 42, that is, a portion of the battery case 42 which will expand most greatly when any of the cells 41 in each of the triple stacked cell group G1 and the double stacked cell group G2 has swollen may be smaller than that (i.e., the second distance) between another area of the press plate 13 and another area of the outer surface of the battery case 42. Therefore, when any of the cells 41 in either of the triple stacked cell group G1 and the double stacked cell group G2 has swollen, a corresponding one of the upper protrusions 136 will first touch the upper surface of the battery case 42 to press the greatest expansion of the portion of the battery case 42.

The bottom plate 21 of the base 14, as already described in FIG. 8(*a*), includes the lower protrusions 32 each of which bulges toward the assembled battery module 11 at an interval away therefrom and is so located as to make contact with a portion of the assembled battery module 11 which is aligned with a portion of each of the cells 41 which will expand most greatly in each of the triple stacked cell group G1 and the double stacked cell group G2. Therefore, when any of the cells 41 in one of the triple stacked cell group G1 and the double stacked cell group G2 has swollen, a corresponding one of the lower protrusions 32 is kept rigidly in contact with the lower surface of the assembled battery module 11 to suppress the swelling of the cell 41.

Modifications of the above embodiment will be described below.

Figure 22:
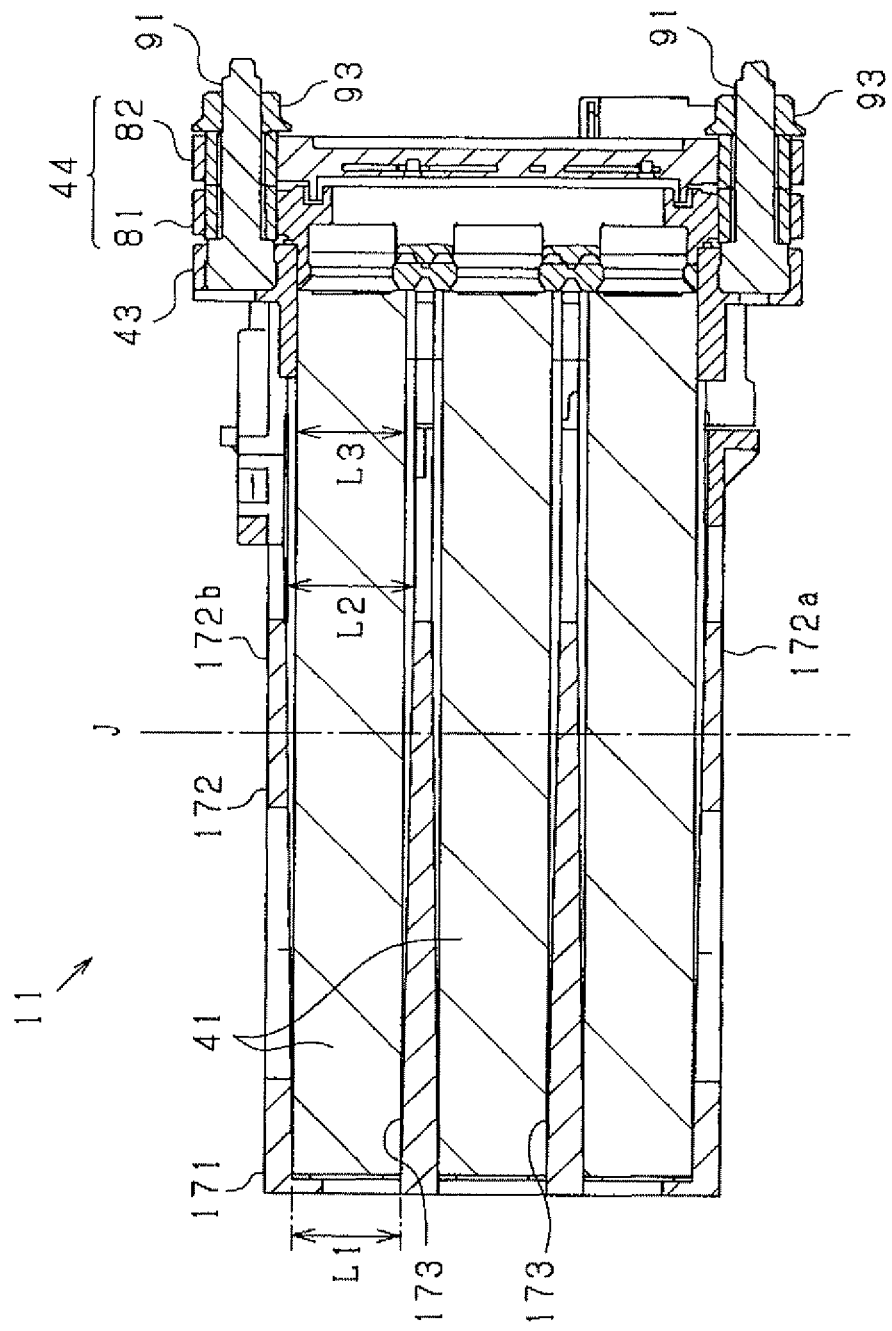
FIG. 22 is a sectional view which illustrates a modification of the assembled battery module of FIG. 10.

FIG. 22 is a vertical sectional view which shows a battery case 171 that is a modification of the battery case 42 of the assembled battery module 11. The same reference numbers as employed in FIG. 14 will refer to the same parts, and explanation thereof in detail will be omitted here.

The battery case 171 includes an outer shell 172 and partition plates 173 which define cell chambers which are laid to overlap each other vertically and in which the respective cells 41 are disposed. The battery case 171 is in contact with at least a portion of the outer periphery of each of the cells 41 to retain it. Specifically, each of the cell chambers in the battery case 171 is so designed as to have a greater thickness at the rear thereof (i.e., the left in FIG. 22) and a smaller thickness at the front thereof (i.e., the right in FIG. 22) in the thickness-wise direction of the cells 41. In other words, each of the cell chambers has a narrower space at the rear thereof. Each of the cells 41 is held firmly by the battery case 171 at the rear of the chamber.

More specifically, if a vertical distance (i.e., the thickness) of the rear of each of the cell chambers is, as illustrated in FIG. 22, defined as L1, and a vertical distance of the front of each of the cell chambers is defined as L2, they meets a relation of L1<L2. The vertical distance L1 is set slightly smaller than the thickness L3 of the cells 41, so that each of the cells 41 may be press-fit in the rear of a corresponding one of the cell chambers. The installation of each of the cells 41 in one of the cell chambers is achieved by inserting the cell 41 into the front of the cell chamber and thrusting it into the rear of the cell chamber. The rear of the cell chamber is elastically deformed, so that it grasps the rear of the cell 41. The front of the cell 41 is disposed at a given interval away from the inner wall of the battery case 171 in the vertical direction of the assembled battery module 11 (i.e., the thickness-wise direction of the cells 41). In other words, air gaps exist above and below each of the cells 41. A portion of each of the cells 41 exposed outside the cell chamber (i.e., the battery case 171) is retained by the insulating cover 43 to hold the cell 41 firmly without any play.

The air gaps above and below each of the cells 41 cover upper and lower portions (i.e., upper and lower central portions) of the cell 41 which are expected to expand most greatly. The upper and lower portions of the cell 41 are located at an interval of 1 mm away from the inner wall of the battery case 171. The interval may be selected between 0.5 mm and 2 mm.

A difference between the distances L1 and L2 may be established by shaping inner surfaces of a lower plate 172a, an upper plate 171b, and each of the partition plates 173 to incline at a given angle to a horizontal line (i.e., a longitudinal center line of the battery case 171). Alternatively, the lower plate 172a, the upper plate 171b, and each of the partition plates 173 may be shaped to have a stepped surface.

As apparent from the above discussion, the battery case 171 is so designed that each of the cells 41 is separated from the partition plates 173 or from the partition plate 173 and the lower plate 172a or the upper plate 172b except the rear thereof when the cells 41 are not swelling in the thickness-wise direction thereof (i.e., a direction in which the cells 41 are stacked). In other words, at least the central areas of the upper and lower surfaces of each of the cells 41 are placed in non-contact with the inner wall of the battery case 171, thereby permitting the cell 41 to swell slightly. If the each of the cells 41 is disposed in constant contact with the inner wall of the battery case 171, it will result in exertion of excessive stress on the cell 41 when having swollen. In order to alleviate such a problem, the battery case 171 is so designed that the air gaps are created above and below each of the cell 41.

Figure 23:
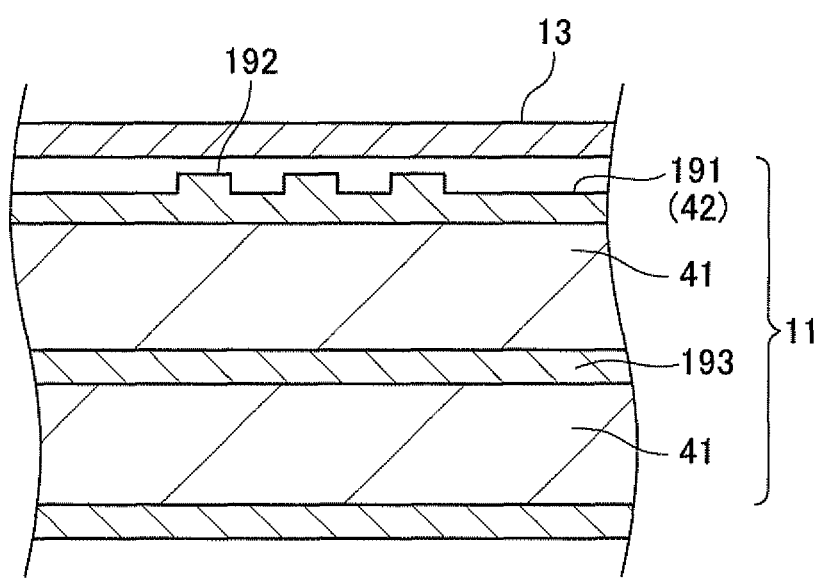
FIG. 23 is a partial sectional view which illustrates another modification of the assembled battery module of FIG. 10.

The press plate 13 is, as described above, equipped with the upper protrusions 136 which make physical contacts with the battery case 42 when the cells 41 have swollen, however, the battery case 42 may instead be designed to have protrusions, like the upper protrusions 136, which bulge toward the press plate 13. For instance, the battery case 42 is, as illustrated in FIG. 23, engineered to have a plurality of protrusions or bosses 192 formed integrally with the upper plate 191. The bosses 192 bulge toward the press plate 13. The bosses 192 have flat upper ends which are on the same level. The cell chambers in which the cells 41 are disposed are defined by partition plates 193. When any of the cells 41 has swollen, the bosses 192 will first touch the surface of the press plate 13, thereby suppressing the swell of the cell 41.

Both the press plate 13 and the battery case 42 may be designed to have protrusions, like the ones, as described above.

The upright wall 22 of the base 14, as described above, has the cylindrical supports 24 extending upward from the fence plate 23. The assembled battery module 11, the control board 12, and the press plate 13 are retained by the cylindrical supports 24. The base 14 may alternatively be designed to have a plate(s) or a cylinder(s) separately from the upright wall 22 for mounting the assembled battery module 11, the control board 12, and the press plate 13. The plate(s) or cylinder(s) extend vertically from the bottom plate 21. The assembled battery module 11, the control board 12, and the press plate 13 are joined to, for example, an end(s) of the plate(s) or the cylinder(s).

The upright wall 22 of the base 14 is placed inside the side wall 36 of the cover 15, however, the assembly thereof may alternatively be made to have a double-wall structure in which the upright wall 22 is located outside the side wall 36. When the battery unit 10 is submerged in water, such a structure causes water to flow downwardly between the upright wall 22 and the side wall 36 and then enter the case chamber in which the assembled battery module 11 from below the lower end of the side wall 36. In other words, the water is admitted into the case chamber at a level lower than the upright wall 33 (i.e., the fence plate 23) of the base 14, thus decreasing a possibility that the control board 12 is splashed with water when the water is starting to enter between the upright wall 22 and the side wall 36.

The control board 12 is placed with a partial overlap with the assembled battery module 11, however, may alternatively be so shaped as to fully overlap the assembled battery module 11 in the vertical direction of the battery unit 10.

The battery unit 10 is, as described above, mounted beneath the seats in the passenger compartment of the vehicle, however, may be disposed inside a dashboard or an engine compartment of the vehicle.

Each of the cells 41 is, as described above, a lithium-ion storage cell, but may be implemented by another type of secondary cell such as a nickel-cadmium storage cell or a nickel-hydrogen storage cell(s).

The battery unit 10 may be used with hybrid vehicles equipped with an internal combustion engine and an electric motor for driving road wheels or an electric vehicle equipped with only the electric motor as a drive source.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A battery unit comprising:
an assembled battery module equipped with a plurality of cells;
a control board on which a controller is mounted to control a charging/discharging operation of the cells; and
a storage case in which the assembled battery module and the control board are disposed, the storage case including a bottom plate over which the assembled battery module is mounted,
wherein the assembled battery module includes a battery body in which the cells are stacked over the bottom plate,
wherein a swell limiter is provided on an opposite side of the assembled battery module than the bottom plate is, the swell limiter being separate from the battery body in a condition where none of the cells are swollen and making physical contact with the battery body only in a condition where any of the cells has swollen to suppress swelling of any of the cells.

2. A battery unit as set forth in claim 1, wherein the swell limiter is made of a press plate having a degree of rigidity high enough to withstand elastic deformation thereof when subjected to pressure arising from swelling of the cells, and the press plate is fixed on an upright member extending from the bottom plate of the base using a screw.

3. A battery unit as set forth in claim 2, wherein the battery body has a first surface and a second surface opposed to the first surface, the battery body being placed with the second surface facing the bottom plate of the storage case, wherein the press plate has a surface which faces the first surface of the battery body at a given interval away therefrom when none of the cells are swollen, wherein the press plate is so shaped as to have a first distance and a second distance different from the first distance between the surface of the press plate and the first surface of the battery body, the first distance being a minimum interval between the surface of the press plate and an area of the first surface of the battery body which covers a portion of the cells expected to expand most greatly, the second distance being a minimum interval between the surface of the press plate and another area of the first surface of the battery body, the first distance being smaller than the second distance.

4. A battery unit as set forth in claim 3, wherein at least one of the battery body and the press plate has a protrusion bulging toward the other of the battery body and the press plate, the protrusion having a surface which makes physical contact with the other of the battery body and the press plate when any of the cells has swollen, and wherein the protrusion is located in alignment with the portion of the cells expected to expand most greatly in a direction in which the cells swell, the protrusion making the first distance smaller than the second distance.

5. A battery unit as set forth in claim 4, wherein each of the cells is cuboid and has a first and a second maximum surface opposed to each other, the first and second maximum surfaces being the greatest in area of the whole of an outer surface of the cell, the cells being arranged with the first maximum surface being oriented to face the bottom plate of the base and the second maximum surface being located farther away from the bottom plate, and wherein the protrusion being provided on a portion of at least one of the battery body and the press plate which faces a central portion of the second maximum surface of one of the cells.

6. A battery unit as set forth in claim 2, wherein the bottom plate has a bottom protrusion bulging toward the battery body, the bottom protrusion having a surface which makes physical contact with a portion of the battery body which is aligned with a portion of the cells expected to expand most greatly in a direction in which the cells swell.

7. A battery unit as set forth in claim 1, wherein each of the cells is cuboid, further comprising a battery case equipped with partition plates to define within the battery case cell chambers which are laid to overlap each other and in which the cells are disposed, respectively, in a stacked form, and wherein the partition plates work to limit swelling of the cells.

8. A battery unit as set forth in claim 7, wherein each of the cells is disposed in one of the cell chambers at a given interval away from at least one of the partition plates.

* * * * *